US012795358B2

(12) United States Patent
Salkintzis et al.

(10) Patent No.: US 12,795,358 B2
(45) Date of Patent: Nov. 10, 2026

(54) METHOD TO CONNECT TO AN ACCESS NETWORK

(71) Applicant: Lenovo (Singapore) Pte. Ltd., New Tech Park (SG)

(72) Inventors: Apostolis Salkintzis, Athens (GR); Andreas Kunz, Ladenburg (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 267 days.

(21) Appl. No.: 18/693,137

(22) PCT Filed: Oct. 20, 2021

(86) PCT No.: PCT/EP2021/079099
§ 371 (c)(1),
(2) Date: Mar. 18, 2024

(87) PCT Pub. No.: WO2023/041188
PCT Pub. Date: Mar. 23, 2023

(65) Prior Publication Data

US 2025/0008325 A1 Jan. 2, 2025

(30) Foreign Application Priority Data

Sep. 17, 2021 (GR) .............................. 20210100617

(51) Int. Cl.
*H04W 12/06* (2021.01)
*H04W 12/084* (2021.01)
*H04W 84/04* (2009.01)

(52) U.S. Cl.
CPC ......... *H04W 12/06* (2013.01); *H04W 12/084* (2021.01); *H04W 84/042* (2013.01)

(58) Field of Classification Search
CPC .............. H04L 63/0853; H04W 12/06; H04W 12/084; H04W 84/042
See application file for complete search history.

(56) References Cited

U.S. PATENT DOCUMENTS 9,930,614 B2 * 3/2018 McCann ............... H04W 48/16
11,902,783 B2 * 2/2024 Salkintzis ............. H04L 63/166
(Continued)

FOREIGN PATENT DOCUMENTS

AU 2010256311 A1 * 12/2011 ............ H04W 12/06
CA 3001889 A1 * 5/2017 ............ H04W 76/10
(Continued)

OTHER PUBLICATIONS

PCT/EP2021/079099, "Notification of Transmittal of the International Search Report and the Written Opinion of the International Searching Authority, or the Declaration", International Searching Authority, May 13, 2022, pp. 1-17.
(Continued)

*Primary Examiner* — Babar Sarwar
(74) *Attorney, Agent, or Firm* — Kunzler Needham Hilton

(57) ABSTRACT

Apparatuses, methods, and systems are disclosed for connecting a device to an access network. One apparatus includes a processor and a transceiver that sends a first message for connecting to an access network, the first message containing an identity of a PLMN. The transceiver receives a second message from an authentication server, the second message containing a token created in response to the first message. The processor enables a first device to receive the token, the first device having a first subscription with the PLMN. The transceiver receives a third message from the authentication server enabling the apparatus to connect to the access network using the first subscription without the apparatus performing an authentication procedure with the authentication server.

20 Claims, 10 Drawing Sheets

(56) References Cited

U.S. PATENT DOCUMENTS

| | | | | |
|---|---|---|---|---|
| 12,192,753 | B2 * | 1/2025 | Zaus | H04L 65/1016 |
| 2012/0315875 | A1 * | 12/2012 | Breuer | H04L 63/108 455/411 |
| 2013/0189985 | A1 * | 7/2013 | Mutya | H04W 52/0254 455/436 |
| 2015/0222615 | A1 * | 8/2015 | Allain | H04L 67/55 726/4 |
| 2019/0335330 | A1 * | 10/2019 | Salkintzis | H04W 4/80 |
| 2019/0394814 | A1 * | 12/2019 | Bakker | H04W 4/90 |
| 2021/0235269 | A1 * | 7/2021 | Horn | H04W 48/16 |
| 2022/0141662 | A1 * | 5/2022 | Liao | H04W 12/08 726/1 |
| 2022/0248318 | A1 * | 8/2022 | Qiao | H04W 48/18 |
| 2024/0080650 | A1 * | 3/2024 | Wifvesson | H04W 8/005 |

FOREIGN PATENT DOCUMENTS

| | | | | |
|---|---|---|---|---|
| CA | 2959656 | C * | 3/2023 | H04W 16/08 |
| EP | 3281453 | B1 * | 6/2022 | H04W 48/18 |
| WO | WO-2012135563 | A1 * | 10/2012 | H04L 63/18 |
| WO | WO-2012149400 | A2 * | 11/2012 | H04W 72/20 |
| WO | WO-2019097499 | A1 * | 5/2019 | H04W 12/009 |
| WO | WO-2025032037 | A1 * | 2/2025 | H04W 76/15 |

OTHER PUBLICATIONS

CT4, "Enhancements on CT aspects on wireless and wireline convergence for the 5G system architecture", 3GPP TSG-CT Meeting #86 CP-193046, Dec. 9-10, 2019, pp. 1-201.

3GPP, "3rd Generation Partnership Project; Technical Specification Group Services and System Aspects; Study on non-seamless WLAN Offload in 5GS using 3GPP credentials; (Release 17)", 3GPP TR 33.881 V0.1.0, May 2021, pp. 1-8.

3GPP, "3rd Generation Partnership Project; Technical Specification Group Core Network and Terminals; Numbering, addressing and identification; (Release 17)", 3GPP TS 23.003 V17.2.0, Jun. 2021, pp. 1-144.

3GPP, "3rd Generation Partnership Project; Technical Specification Group Services and System Aspects; Procedures for the 5G System (5GS); Stage 2 (Release 17)", 3GPP TS 23.502 V17.1.0, Jun. 2021, pp. 1-692.

* cited by examiner

METHOD TO CONNECT TO AN ACCESS NETWORK

FIELD

The subject matter disclosed herein relates generally to wireless communications and more particularly relates to procedures to enable a first device without network credentials to connect to an access network after being authorized by a second device that possesses valid credentials.

BACKGROUND

Many laptops, tables, or Internet of Things ("IoT") devices do not possess a Universal Subscriber Identity Module ("USIM") and, consequently, they cannot be authorized by a Public Land Mobile Network ("PLMN") to access a Wireless Local Area Network ("WLAN") access network because these devices cannot authenticate with the PLMN.

BRIEF SUMMARY

Disclosed are procedures for connecting a device to an access network. Said procedures may be implemented by apparatus, systems, methods, or computer program products.

One method of a communication device, for example a N5CW device, for connecting a device to an access network includes sending a first message for connecting to an access network, where the first message contains an identity of a PLMN. The method includes receiving a second message from an authentication server containing a token, where the token is created in response to the first message. The method includes enabling a first device to receive the token, where the first device has a first subscription with the PLMN. The method includes receiving a third message from the authentication server enabling the communication device to connect to the access network using the first subscription, where the communication device does not perform authentication with the authentication server.

One method of a AAA server for connecting a device to an access network includes receiving from a communication device (e.g., from a N5CW device) a first message for connecting to an access network and determining to request a first server to authorize the communication device, where the determination is made using a NAI contained in the first message. The method includes receiving a response from the first server containing a token for authorizing the communication device via another device and sending a second message to the communication device, where the second message contains the token.

One method of a User Equipment ("UE") device for connecting a device to an access network includes sending a first authorization message to a first server, where the first authorization message comprises a token received from a communication device. The method includes receiving a second authorization message from the first server, where the second authorization message requests Access Network ("AN") authorization for the communication device. The method also includes requesting user authorization for the communication device to connect to a first AN using a first subscription belonging to the UE device and sending an authorization accept message to the first server in response to a user authorizing the communication device to connect to the first AN using the first subscription.

One method of a backend server for connecting a device to an access network includes receiving a first authorization message from a first device (e.g., a UE that can be authenticated by a PLMN), where the first authorization message comprising a token associated with a second device (e.g., a N5CW device). The method includes sending a second authorization message to the first device. Here, the second authorization message requests access network authorization for the second device, where the first device has a first subscription with the PLMN. The method includes receiving a third authorization message from the first device in response to a user authorizing the second device to connect to a first access network (e.g., a WLAN) using the first subscription and sending an accept message to an authentication server (e.g., an AAA server). Here, the accept message contains an identity of first device and authorizes the second device to connect to the access network using the first subscription.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
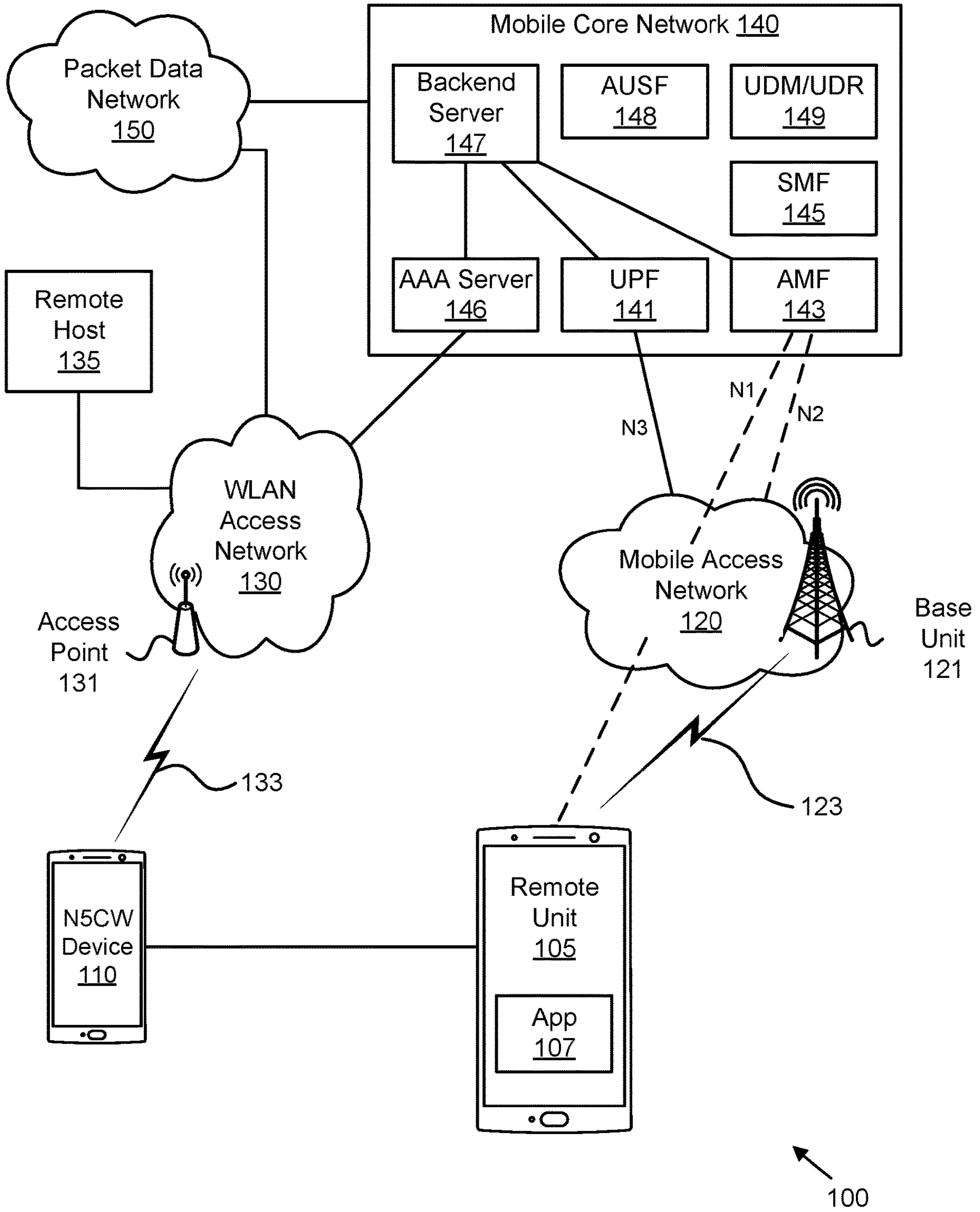
FIG. 1 is a block diagram illustrating one embodiment of a wireless communication system for connecting a device to an access network.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-largescale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The call-flow diagrams, flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the call-flow, flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for authorizing a first device (e.g., a UE having a subscription with a PLMN) to authorize a second device (e.g., a N5CW device) to connect to an access network. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

Work is currently ongoing in Third Generation Partnership Project ("3GPP") to specify procedures with which a Fifth Generation ("5G") network can authorize a device to access a WLAN access network, after the device is successfully authenticated by the 5G network. These procedures are specified as part of the "Study on non-seamless WLAN Offload in 5GS using 3GPP credentials".

A key assumption in these procedures is that the device that attempts to access the WLAN access network must possess valid 3GPP credentials, stored in a USIM module. However, this assumption is many times difficult or costly to be implemented in practice. For example, many laptops, tables, or IoT devices do not possess a USIM module and, consequently, they cannot be authorized by a 5G network to access a WLAN access network, since they cannot authenticate with the 5G network. These communication devices that do not possess a USIM do not support 5G Core Network ("5GC") Non-Access Stratum ("NAS") signaling, and thus are referred to herein as Non-5G-Capable-over-WLAN ("N5CW") devices.

To resolve the above limitation, the present disclosure disclose procedures that enable a first device (e.g., a laptop) without 3GPP credentials to connect to a WLAN access network after being authorized by a second device (e.g., a smartphone) that is registered with the 5G network and possesses valid 3GPP credentials.

The Typical Use Case Enabled by this Disclosure is the Following:

- A laptop without a USIM module attempts to access a WLAN access network by receiving authorization from a 5G PLMN;
- A smartphone that is already registered with this 5G PLMN using valid 3GPP credentials, receives a request to authorize the laptop to access the WLAN access network;
- The user of the smartphone grants authorization; and
- In response, the laptop is admitted connection to the WLAN access network and is associated with the subscription of the smartphone.

The present disclosure presents a new procedure that can be used to enable a N5CW device to access a WLAN access network. A key characteristic of this new procedure is that there is no authentication of the N5CW device. In other words, the N5CW device is not authenticated by the AAA server in a PLMN, as happens in conventional access procedures. Instead, the N5CW device is admitted to the WLAN access network if authorized by the user of another device, which possesses valid credentials (i.e., has a subscription with the PLMN) and can be authenticated by the PLMN.

FIG. 1 depicts a wireless communication system 100 for connecting a device to an access network, according to embodiments of the disclosure. In one embodiment, the wireless communication system 100 includes at least one remote unit 105, a mobile access network 120, and a mobile core network 140. The mobile access network 120, containing at least one base unit 121, and the mobile core network 140 form a mobile communication network. The wireless communication system 100 may also include a Wireless Local Area Network ("WLAN") access network 130 containing at least one access point 131. The remote unit 105 communicates with the mobile access network 120 using wireless communication links 123 and/or communicates with the WLAN access network 130 using wireless communication links 133. Even though a specific number of remote units 105, mobile access networks 120, base units 121, wireless communication links 123, WLAN access networks 130, access points 131, wireless communication links 133, and mobile core networks 140 are depicted in FIG. 1, one of skill in the art will recognize that any number of remote units 105, mobile access networks 120, base units 121, wireless communication links 123, WLAN access networks 130, access points 131, wireless communication links 133, and mobile core networks 140 may be included in the wireless communication system 100.

In one implementation, the mobile access network 120 is compliant with the Fifth-Generation ("5G") system specified in the Third Generation Partnership Project ("3GPP") specifications. For example, the mobile access network 120 may comprise a New Generation Radio Access Network ("NG-RAN"), implementing New Radio ("NR") Radio Access Technology ("RAT") and/or Long-Term Evolution ("LTE") RAT. In another example, the mobile access network 120 may comprise a non-3GPP RAT (e.g., Wi-Fi® or Institute of Electrical and Electronics Engineers ("IEEE") 802.11-family compliant WLAN). In another implementation, the mobile access network 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the mobile access network 120 via uplink ("UL") and downlink ("DL") communication signals. Furthermore, the UL and DL communication signals may be carried over the wireless communication links 123. Similarly, the remote units 105 may communicate with one or more access points 131 in the WLAN access network(s) 130 via UL and DL communication signals carried over the wireless communication links 133. Here, the access networks 120 and 130 are intermediate networks that provide the remote units 105 with access to the mobile core network 140.

The N5CW device 110 represents a class of remote unit 105 that does not have a USIM module and thus is unable to authenticate with the mobile core network 140. As described in greater detail below, because the N5CW device 110 is unable to authenticate directly with the mobile core network 140, the N5CW device 110 may request authorization from the mobile core network 140 to access a WLAN access network 130 using the subscription of a remote unit 105 that has valid credentials for accessing the mobile access network 120 and mobile core network 140. Here, the N5CW device 110 is permitted to connect to the WLAN access network 130 only if authorized by the subscription holder (i.e., remote unit 105).

In some embodiments, the remote units 105 and/or N5CW devices 110 communicate with an application server (e.g., in the packet data network 150) via a network connection with the mobile core network 140. For example, an application 107 (e.g., web browser, media client, telephone and/or Voice-over-Internet-Protocol ("VoIP") application) in a remote unit 105 (or N5CW device 110) may trigger the remote unit 105 (or N5CW device) to establish a protocol data unit ("PDU") session (or other data connection) with the mobile core network 140 via the mobile access network 120. The mobile core network 140 then relays traffic between the remote unit 105 (or N5CW device) and the application server using the PDU session. The PDU session represents a logical connection between the remote unit 105 (or N5CW device) and the User Plane Function ("UPF") 141.

In other embodiments, a remote unit 105 and/or N5CW device 110 may establish a connection with a remote host 135 for direct offload of certain traffic. For example, the remote host may be a local instance (e.g., in an edge computing network) of an application server also having instances in the data network 150. Here, a corresponding application client in the remote unit 105 and/or N5CW device 110 may establish a connection with the remote host 135. As discussed in greater detail below, a UE Route Selection Policy ("URSP") rule in the remote unit 105 and/or N5CW device 110 may indicate that certain traffic is to be directly offloaded to the remote host 135 rather than transferred to the data network 150 via PDU session.

In order to establish the PDU session (or PDN connection), the remote unit 105 (or N5CW device) must be registered with the mobile core network 140 (also referred to as "attached to the mobile core network" in the context of a Fourth Generation ("4G") system). Note that the remote unit 105 (or N5CW device) may establish one or more PDU sessions (or other data connections) with the mobile core network 140. As such, the remote unit 105 (or N5CW device) may have at least one PDU session for communicating with the packet data network 150. The remote unit 105 (or N5CW device) may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 (or N5CW device) and a specific Data Network ("DN") through the UPF 141. A PDU Session supports one or more Quality of Service ("QoS") Flows. In certain embodiments, there may be a one-to-one mapping between a QoS Flow and a QoS profile, such that all packets belonging to a specific QoS Flow have the same 5G QOS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 (or N5CW device) and a Packet Gateway ("PGW", not shown) in the mobile core network 140. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of an access network ("AN"), such as the mobile access network 120, that may include one or more controllers communicably coupled to one or more corresponding base units 121. These and other elements of radio access network are not illustrated but are well known generally by those having ordinary skill in the art. The base units 121 connect to the mobile core network 140 via the mobile access network 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121. Note that during NR operation on unlicensed spectrum (referred to as "NR-U"), the base unit 121 and the remote unit 105 communicate over unlicensed (i.e., shared) radio spectrum.

The WLAN access networks 130 may be distributed over a geographic region. Each WLAN access network 130 may serve a number of remote units 105 and/or N5CW devices 110 with a serving area. An access point 131 in a WLAN access network 130 may communicate directly with one or more remote units 105 and/or N5CW devices 110 by receiving UL communication signals and transmitting DL communication signals to serve the remote units 105 and/or N5CW devices 110 in the time, frequency, and/or spatial domain. Both DL and UL communication signals are carried over the wireless communication links 133. In some embodiments, the wireless communication links 123 and the wireless communication links 133 may employ different frequencies and/or different communication protocols. In various embodiments, an access point 131 may communicate using unlicensed radio spectrum.

In one embodiment, the mobile core network 140 is a 5GC or an Evolved Packet Core ("EPC"), which may be coupled to a packet data network 150, like the Internet and private data networks, among other data networks. A remote unit 105 may have a subscription or other account with the mobile core network 140. In various embodiments, each mobile core network 140 belongs to a single mobile network operator ("MNO"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane ("CP") functions including, but not limited to, an Access and Mobility Management Function ("AMF") 143 that serves the mobile access network 120, a Session Management Function ("SMF") 145, an Authentication, Authorization, and Accounting ("AAA") server 146, a Backend server 147, an Authentication Server Function ("AUSF") 148, a Unified Data Management function ("UDM") and a User Data Repository ("UDR"). Although specific numbers and types of network functions are depicted in FIG. 1, one of skill in the art will recognize that any number and type of network functions may be included in the mobile core network 140.

The UPF(s) 141 is/are responsible for packet routing and forwarding, packet inspection, QoS handling, and external PDU session for interconnecting Data Network (DN), in the 5G architecture. The AMF 143 is responsible for termination of NAS signaling, NAS ciphering & integrity protection, registration management, connection management, mobility management, access authentication and authorization, security context management. The SMF 145 is responsible for session management (i.e., session establishment, modification, release), remote unit (i.e., UE) IP address allocation & management, DL data notification, and traffic steering configuration of the UPF 141 for proper traffic routing.

The AAA server 146 handles user requests for access to network resources and provides authentication, authorization, and accounting (AAA) services. The AAA server 146 may interact with the UDM to retrieve subscription information for a remote unit 105.

The Backend server 147 coordinates access authorization for a N5CW device 110 by a remote unit 105 having a subscription with the mobile core network 140. As described in greater detail below, the Backend server 147 generates and provides to the AAA server 146 an access token corresponding to a N5CW device 110 that petitions to connect to the WLAN access network 130. If the Backend server 147 receives the access token from a remote unit 105 having valid credentials, and if the remote unit 105 authorizes access by the N5CW device 110, then the Backend server 147 authorizes the petitioning N5CW device 110 to connect to the WLAN access network 130 without requiring authentication of the N5CW device 110.

In some embodiments, the remote unit 105 establishes a connection with the Backend server 147 to provide the access token and to authorize the petitioning N5CW device 110. For example, the remote unit 105 may connect directly to the Backend server 147 via the packet data network 150. As another example, the remote unit 105 may connect to the Backend server 147 via the UPF 141. In other embodiments, the remote unit 105 communicates with the Backend server 147 using NAS messaging, where the AMF 143 relays NAS messages between the remote unit 105 and the Backend server 147.

The AUSF 148 is an authentication entity for 5G authentication procedures. In some embodiments, the AUSF 148 in a home network performs authentication with a 5G-capable remote unit 105. In certain embodiments, the AUSF 148 makes the decision on UE authentication, but it relies on backend service for computing the authentication data and keying materials when 5G-AKA or EAP-AKA' is used.

The UDM is responsible for generation of Authentication and Key Agreement ("AKA") credentials, user identification handling, access authorization, subscription management. The UDR is a repository of subscriber information and may be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 49.

In various embodiments, the mobile core network 140 may also include a Network Repository Function ("NRF") (which provides Network Function ("NF") service registration and discovery, enabling NFs to identify appropriate services in one another and communicate with each other over Application Programming Interfaces ("APIs")), a Network Exposure Function ("NEF") (which is responsible for making network data and resources easily accessible to customers and network partners), a Policy Control Function ("PCF") (which is responsible for unified policy framework, providing policy rules to CP functions, access subscription information for policy decisions in UDR). or other NFs defined for the 5GC.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. For example, one or more network slices may be optimized for enhanced mobile broadband ("eMBB") service. As another example, one or more network slices may be optimized for ultra-reliable low-latency communication ("URLLC") service. In other examples, a network slice may be optimized for machine-type communication ("MTC") service, massive MTC ("mMTC") service, Internet-of-Things ("IoT") service. In yet other examples, a network slice may be deployed for a specific application service, a vertical service, a specific use case, etc.

A network slice instance may be identified by a single-network slice selection assistance information ("S-NSSAI") while a set of network slices for which the remote unit 105 (or N5CW device) is authorized to use is identified by network slice selection assistance information ("NSSAI"). Here, "NSSAI" refers to a vector value including one or more S-NSSAI values. In certain embodiments, the various network slices may include separate instances of network functions, such as the SMF 145 and UPF 141. In some embodiments, the different network slices may share some common network functions, such as the AMF 143. The different network slices are not shown in FIG. 1 for ease of illustration, but their support is assumed.

While FIG. 1 depicts components of a 5G RAN and a 5G core network, the described embodiments for connecting a device to an access network apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

Moreover, in an LTE variant where the mobile core network 140 is an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 143 may be mapped to an MME, the SMF 145 may be mapped to a control plane portion of a PGW and/or to an MME, the UPF 141 may be mapped to an SGW and a user plane portion of the PGW, the UDM/UDR 149 may be mapped to an HSS, etc.

In the following descriptions, the term "UE" is used for the mobile station/remote unit, but it is replaceable by any other remote device, e.g., remote unit, MS, ME, etc. Further, the operations are described mainly in the context of 5G NR. However, the below described solutions/methods are also equally applicable to other mobile communication systems for connecting a device to an access network.

Figure 2A:
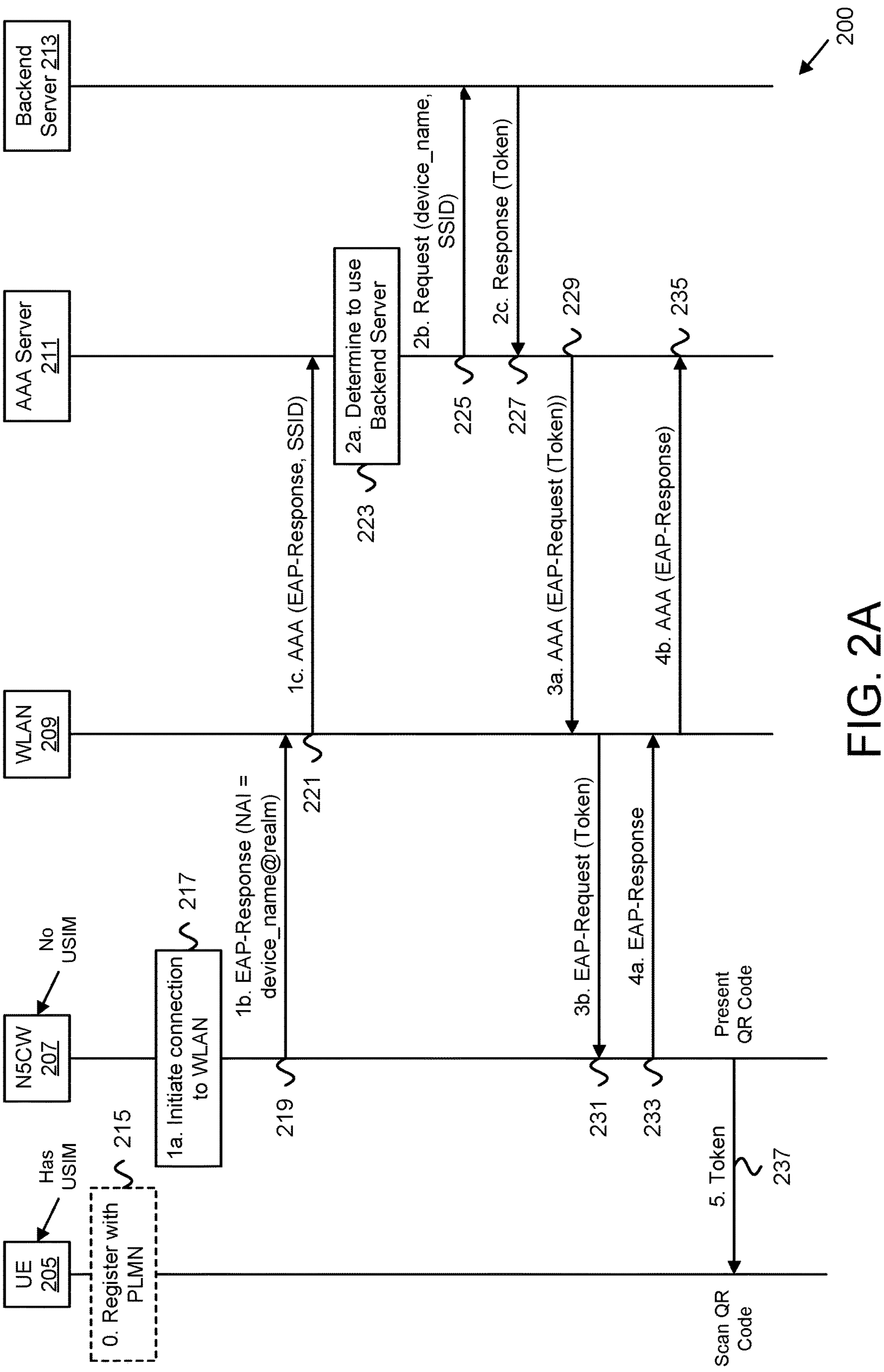
FIG. 2A is a call-flow diagram illustrating one embodiment of a procedure for connecting a N5CW device to an access network.
Figure 2B:
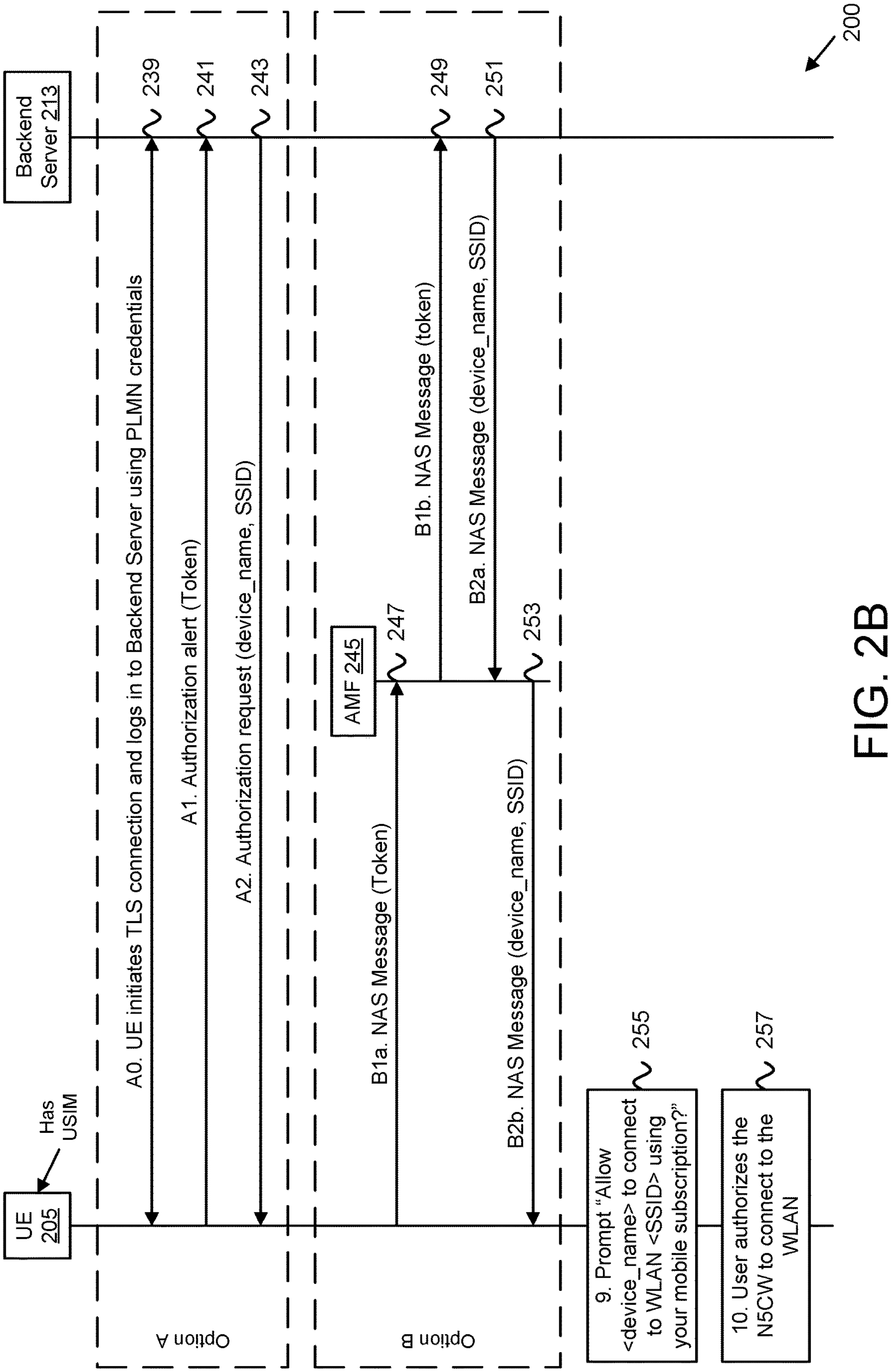
FIG. 2B is a continuation of the call-flow diagram of FIG. 2A.
Figure 2C:
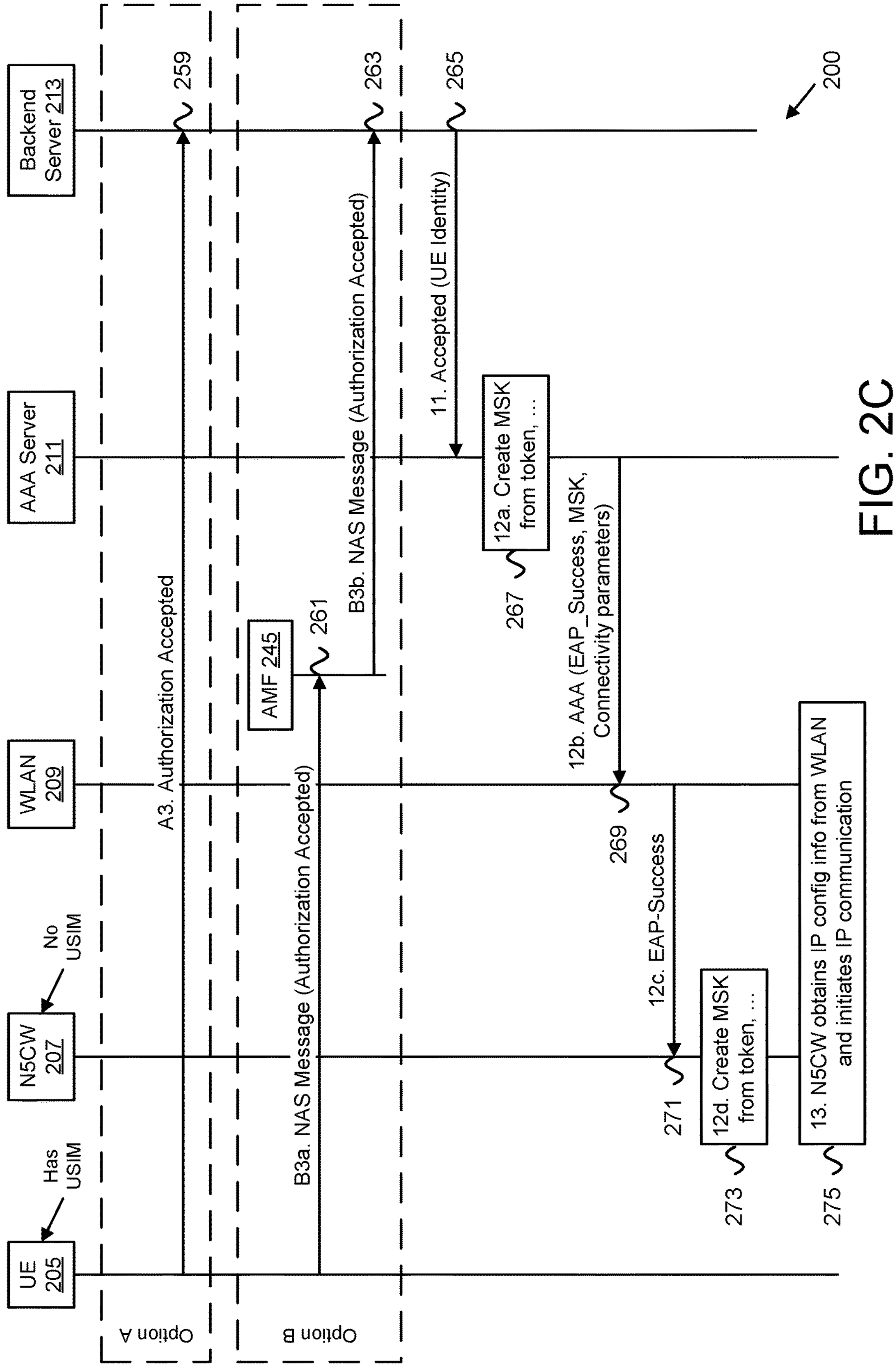
FIG. 2C is a continuation of the call-flow diagrams of FIGS. 2A and 2B.

FIGS. 2A-2C depict a procedure 200 for connecting a device to an access network, according to embodiments of the disclosure. The procedure 200 involves a N5CW device 207 that seeks access to a WLAN 209. Here, the N5CW device 207 may be one embodiment of the N5CW device 110, while the WLAN 209 is representative of an access network and may be one embodiment of the WLAN access network 130. The procedure 200 also involved a UE 205, an AAA server 211 and a Backend server 213. Here, the UE 205 may be one embodiment of the remote unit 105, the AAA server 211 may be one embodiment of the AAA server 146, and the Backend server 213 may be one embodiment of the Backend server 147. In certain embodiments, the procedure 200 also involves an AMF 245, which may be one embodiment of the AMF 143.

The signaling procedure 200 is applied when a Non-5G-capable-over-WLAN ("N5CW") device 207 requests authorization from a PLMN to access (i.e., connect to) a WLAN access network 209. Here, it is assumed that the N5CW device 207 does not have any USIM to authenticate directly with the network. Because of this, the N5CW device 207 does not support 5GC NAS signaling over the WLAN access network 209 access.

Beginning at FIG. 2A, in optional Step 0, as a precondition, the UE 205 powers up and registers with the PLMN (see block 215). In various embodiments, the registration procedure is conducted between UE 205 and PLMN is based on the procedures known in the art.

At Step 1a, the N5CW device 207 selects an available WLAN access network 209 and initiates an Extensible Authentication Protocol ("EAP") procedure to connect to this WLAN access network 209 (see block 217). The EAP packets exchanged between the N5CW device 207 and the WLAN access network 209 are encapsulated into Layer-2 frames, e.g., IEEE 802.1x frames. The N5CW device 207 may select the WLAN access network 209 either because the WLAN access network 209 advertises (e.g., via Access Network Query Protocol ("ANQP")) that it supports interworking with a specific PLMN, or because the N5CW device 207 is pre-configured with the identity (e.g., Service Set Identifier ("SSID")) of this WLAN access network 209.

At Step 1b, the N5CW device 207 provides its Network Address Identifier (NAI=username@realm) in an EAP-Response packet (see messaging 219). The Network Address Identifier ("NAI") contains a username, which can be a device name (denoted "device_name"), and a realm that includes an identity of the PLMN that should be used to authorize the N5CW device 207 to access the WLAN access network 209. For example, the NAI could be set to "device_name@nai.5gc-nn.mnc<MNC>.mcc<MCC>0.3gppnetwork.org". This kind of realm is already specified in 3GPP TS 23.003, and it is utilized by devices which cannot support NAS signaling over WLAN access network 209. Note that the combination of Mobile Country Code ("MCC") and Mobile Network Code ("MNC") uniquely identifies a mobile network operator (carrier) or PLMN.

In some embodiments, the NAI may also include a special identifier (e.g., the character "!"), or have a special format, which indicates what type of authentication/authorization procedure is preferred by the N5CW device 207. In this case, the identifier indicates that the N5CW device 207 prefers to be authorized via another device (e.g., UE 205), which possesses a regular PLMN subscription and may be already registered with the PLMN.

At Step 1c, the EAP-Response message, including the NAI, is encapsulated in a AAA request message and is forwarded to a AAA server 211 in the PLMN identified by the realm (see messaging 221). The AAA request message also includes an identity of the WLAN access network 209, e.g., an SSID.

At Step 2a, after receiving the AAA request in step 1c, the AAA server 211 determines, based on the NAI provided by the N5CW device 207, to use the Backend server 213 and to request from the Backend server 213 to authorize the N5CW device 207 to access the WLAN access network 209 (see block 223).

Therefore, at Step 2b, the AAA server 211 creates a new session with the Backend server 213 and sends a request message to the Backend server 213 including the device_name of the N5CW device 207 and the SSID of the WLAN access network 209 (see messaging 225).

At Step 2c, in response to the request message, the Backend server 213 creates a unique token associated with the new session and provides the token to the AAA server 211 (see messaging 227). In various embodiments, the token may be a sufficient long random number, e.g., 256 bits or greater.

At Step 3a, the AAA server 211 encapsulates the token in an EAP-Request packet and forwards this packet to the N5CW device 207 via the WLAN access network 209 (see messaging 229).

At Step 3b, the N5CW device 207 receives the EAP-Request packet containing the token (see messaging 231).

At Step 4a, the N5CW device 207 responds to the EAP-Request packet received in Step 3b with an EAP-Response packet, which confirms the reception of the token. The N5CW device 207 forwards the EAP-Response packet to the AAA server 211 via the WLAN access network 209 (see messaging 233).

At Step 4b, the EAP-Response packet is transferred to the AAA server 211 within a AAA message (see messaging 235). After the AAA server 211 receives the EAP-Response, the AAA server 211 waits for the Backend server 213 to indicate whether the N5CW device 207 is authorized to access the WLAN access network 209, or not. In the depicted signaling procedure, this occurs later (i.e., in Step 11).

At Step 5, the token is transferred from the N5CW device 207 to the UE 205 (see messaging 237). For example, the N5CW device 207 presents a Quick Response ("QR") code (e.g., a two-dimensional barcode or matrix barcode) that encodes the token, and the UE 205 scans the QR code (essentially, an application in the UE 205 scans the QR code). Alternatively, the QR code may be transferred to UE 205 via Bluetooth, via Near-Field Communication ("NFC"), or via another method that enables device-to-device communication.

Continuing at FIG. 2B, note that the UE 205 can communicate with the Backend server 213 either (A) directly using IP communication, or (B) via an AMF 245 using NAS signaling messages. These two alternative methods are shown in FIGS. 2B and 2C as Option A and Option B, respectively.

According to Option A, at Step A0, right after the UE 205 receives the token, the UE 205 initiates a secure Transport Layer Security ("TLS") connection with the Backend server 213 (see messaging 239). In one embodiment, the Internet Protocol ("IP") address of the Backend server 213 may be preconfigured in the UE 205. In another embodiment, the IP address of the Backend server 213 may be provided to UE 205 along with the token in step 5 (e.g., the IP address can also be encoded in the QR code, or the token itself can contain the IP address).

After the secure TLS connection is established, the UE 205 logs in to the Backend server 213 by using credentials that identify the UE 205's subscription in the PLMN. For example, the UE 205 may log in using its Mobile Station Integrated Services Digital Network ("MSISDN"), or its Subscription Permanent Identifier ("SUPI"), or another identifier that refers to a PLMN subscription. Note that Step A0 may be skipped if the UE 205 has already established the TLS connection with the Backend server 213 and is logged in to the Backend server 213 when the UE 205 receives the token from the N5CW device 207.

At Step A1, the UE 205 sends to the Backend server 213 the token receives from the N5CW device 207 in Step 5 (see messaging 241). The token enables the Backend server 213 to associate the UE 205 with the session established in Step 2 by the AAA server 211, requesting for authorization for the N5CW device 207 to connect to the WLAN access network 209.

At Step A2, the Backend server 213 sends an authorization request message to UE 205 including the identity of the N5CW device 207 (i.e., "device_name") and the WLAN access network 209 identity (i.e., SSID), as received in Step 2b (see messaging 243). Note that Step 9 directly follows Step A2.

According to Option B, at Step B1a, right after the UE 205 receives the token, the UE 205 includes the token in a NAS message and sends this message to the AMF 245, to which the UE 205 is registered (see messaging 247). Note that Step 5 immediately precedes Step B1a.

At Step B1b, the AMF 245 relays the NAS message to the Backend server 213 (see messaging 249). Hence, the Backend server 213 receives the token from the UE 205.

At Step B2a, the Backend server 213 creates a NAS message and includes in the NAS message the device_name and the SSID of the WLAN access network 209. The Backend server 213 then forwards the NAS message to the AMF 245 (see messaging 251).

At Step B2b, the AMF 245 then relays the NAS message to the UE 205 (see messaging 253).

At Step 9, the UE 205 asks for the user to authorize the N5CW device 207 to connect to the WLAN access network 209 (see block 255). For example, the UE 205 may present a message: "Allow <device_name> to connect to WLAN access network 209<SSID> using your mobile subscription?".

At Step 10, the user responds to the prompt from the UE 205, i.e., by allowing (or denying) the named N5CW device 207 to access the WLAN access network 209 using the subscription of the UE 205 (see block 257). In the depicted embodiment, it is assumed that the user authorizes the N5CW device 207 to connect to the WLAN access network 209.

Continuing at FIG. 2C, recall that the UE 205 can communicate with the Backend server 213 according to either Option A (i.e., directly using IP communication) or Option B (i.e., via the AMF 245 using NAS signaling messages). Here, the UE 205 uses the same Option selected previously to send the token to the Backend server 213.

According to Option A, at Step A3, if the user authorizes the <device_name> (i.e., the N5CW device 207) to connect to the WLAN access network 209, the UE 205 sends an Authorization accepted message to the Backend server 213 (see messaging 259). Otherwise, the UE 205 sends an Authorization reject message to the Backend server 213 (not shown). Note that Step 11 directly follows Step A3.

According to Option B, as Step B3a, if the user authorizes the <device_name> (i.e., the N5CW device 207) to connect to the WLAN access network 209, the UE 205 creates a NAS message including an Authorization accepted indication and forwards the NAS message to the AMF 245 (see messaging 261). Note that Step 10 immediately precedes Step B3a.

At Step B3b, in turn, the AMF 245 relays this NAS message to the Backend server 213 (see messaging 263). Note that if the user does not authorize the <device_name>, the UE 205 includes in the NAS message an Authorization reject indication (not shown).

At Step 11, in response to the Authorization accepted message/indication, the Backend server 213 sends an Accepted message to the AAA server 211 (see messaging 265). Here, the Accepted message contains a UE 205 identity, e.g., an MSISDN, SUPI or another identity. This UE 205 identity can be used by the AAA server 211 to retrieve subscription information (e.g., stored in the UDM) that contains e.g., connectivity restrictions for the N5CW device 207, charging information, etc. As an example, the subscription information may indicate that certain services, or IP addresses or domain names should not be reachable via the WLAN access network 209. Also, the subscription information may indicate that all traffic or selected traffic sent by the N5CW device 207 via the WLAN access network 209 should be charged with a certain charging rate.

At Step 12a, after retrieving the subscription information (not shown in FIG. 2C), the AAA server 211 creates a Master Session Key ("MSK") from the token and from other parameters (such as the device_name, subscription data, etc.) (see block 267).

At Step 12b, the AAA server 211 sends a AAA message to the WLAN access network 209 (see messaging 269). Here, the AAA message includes an EAP-Success packet and the MSK. Optionally, the AAA message may include connectivity parameters (e.g., connectivity restrictions for the N5CW device 207), etc. Subsequently, the MSK is used to derive WLAN access network 209-specific security keys (e.g., a Pairwise Master Key ("PMK")), and these keys are applied to protect the unicast and multicast traffic between the N5CW device 207 and the WLAN access network 209.

At Step 12c, the EAP-Success packet is forwarded to the N5CW device 207, which completes the EAP session and enables the N5CW device 207 to access the WLAN access network 209 (see messaging 271).

At Step 12d, the N5CW device 207 creates also the same MSK, as the one provided to the WLAN access network 209 by the AAA server 211 (see block 273). Subsequently, the MSK is used to derive WLAN access network 209-specific security keys (e.g., a Pairwise Master Key, PMK), and these keys are applied to protect the unicast and multicast traffic between the N5CW device 207 and the WLAN access network 209.

At Step 13, the N5CW device 207 obtains IP configuration information (including an IP address) from the WLAN access network 209 and initiates IP communication, e.g., web browsing, email access, etc. (see block 275).

Figure 3:
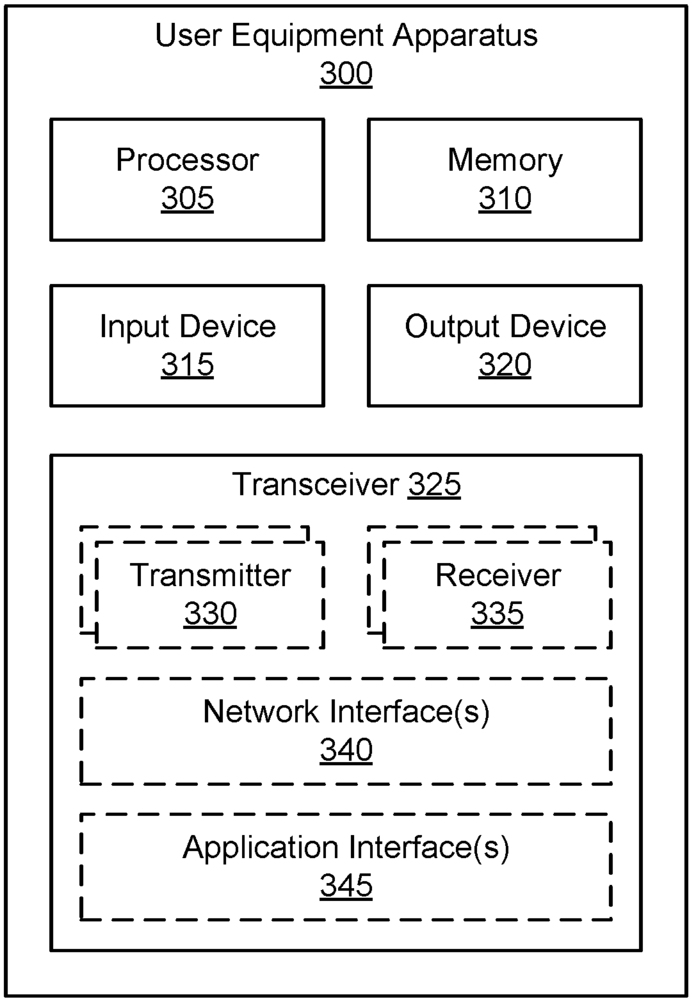
FIG. 3 is a block diagram illustrating one embodiment of a user equipment apparatus that may be used for connecting a device to an access network.

FIG. 3 depicts a user equipment apparatus 300 that may be used for connecting a device to an access network, according to embodiments of the disclosure. In various embodiments, the user equipment apparatus 300 is used to implement one or more of the solutions described above. In certain embodiments, the user equipment apparatus 300 contains a USIM module (not shown) and thus may be one embodiment of the remote unit 105 and/or the UE 205, described above. In other embodiments, the user equipment apparatus 300 does not contain a USIM module and thus may be one embodiment of the N5CW device 110 and/or the N5CW device 207, described above. Furthermore, the user equipment apparatus 300 may include a processor 305, a memory 310, an input device 315, an output device 320, and a transceiver 325.

In some embodiments, the input device 315 and the output device 320 are combined into a single device, such as a touchscreen. In certain embodiments, the user equipment apparatus 300 may not include any input device 315 and/or output device 320. In various embodiments, the user equipment apparatus 300 may include one or more of: the processor 305, the memory 310, and the transceiver 325, and may not include the input device 315 and/or the output device 320.

As depicted, the transceiver 325 includes at least one transmitter 330 and at least one receiver 335. In some embodiments, the transceiver 325 communicates with one or more cells (or wireless coverage areas) supported by one or more base units 121. In various embodiments, the transceiver 325 is operable on unlicensed spectrum. Moreover, the transceiver 325 may include multiple UE panels supporting one or more beams. Additionally, the transceiver 325 may support at least one network interface 340 and/or application interface 345. The application interface(s) 345 may support one or more APIs. The network interface(s) 340 may support 3GPP reference points, such as Uu, N1, PC5, etc. Other network interfaces 340 may be supported, as understood by one of ordinary skill in the art.

The processor 305, in one embodiment, may include any known controller capable of executing computer-readable instructions and/or capable of performing logical operations. For example, the processor 305 may be a microcontroller, a microprocessor, a central processing unit 20) ("CPU"), a graphics processing unit ("GPU"), an auxiliary processing unit, a field programmable gate array ("FPGA"), or similar programmable controller. In some embodiments, the processor 305 executes instructions stored in the memory 310 to perform the methods and routines described herein. The processor 305 is communicatively coupled to the memory 310, the input device 315, the output device 320, and the transceiver 325.

In various embodiments, the processor 305 controls the user equipment apparatus 300 to implement the above described UE behaviors. In certain embodiments, the processor 305 may include an application processor (also known as "main processor") which manages application-domain and operating system ("OS") functions and a baseband processor (also known as "baseband radio processor") which manages radio functions.

In various embodiments, the transceiver 325 (i.e., supporting a radio interface) that sends a first authorization message to a first server (i.e., a backend server) and receives a second authorization message from the first server. Here, the first authorization message includes a token received from a communication device (e.g., a N5CW device) and the second authorization message requests Access Network ("AN") authorization for the communication device. The processor 305 requests user authorization for the communication device to connect to a first AN using a first subscription belonging to the apparatus 300. The transceiver 325 sends an authorization accept message to the first server in response to a user authorizing the communication device to connect to the first AN using the first subscription.

In some embodiments, the apparatus 300 also includes an image capture device, such as a camera, a QR code reader, or the like. In such embodiments, receiving the token from the communication device may include capturing a visual representation of the token generated by the communication device. Note that the image capture device may be a part of the input device 315. The processor 305 may then obtain the token from the captured visual representation. In other embodiments, receiving the token from the communication device includes receiving the token using a device-to-device communication link. In various embodiments, the token may be received using an audio signal, an ultrasonic signal, an optical signal, a radio signal, etc. In further embodiments, the token may be a character string (e.g., alphanumeric) that is manually input by a user of the apparatus 300.

In some embodiments, the second authorization message comprises an identity of the communication device and an identity of the first AN. In such embodiments, requesting user authorization for the communication device to connect to the first AN may include presenting to the user the identity of the communication device and the identity of the first AN. In some embodiments, the first authorization message and the authorization accept message are sent to the first server using NAS messaging (i.e., received via an AMF) and the second authorization message is received from the first server using NAS messaging (i.e., received via the AMF).

In some embodiments, the processor 305 establishes a secure connection with the first server and authenticates the apparatus 300 with the first server using credentials that identify the first subscription. In such embodiments, the first authorization message and the authorization accept message are sent using the secure connection and the second authorization message is received using the secure connection. In certain embodiments, the token received from the communication device comprises a network address of the first server.

In various embodiments, the processor 305 controls the apparatus 300 to perform the above described N5CW device functions and behaviors. In such embodiments, the transceiver 325 (i.e., supporting a radio interface) sends a first message for connecting to an access network (e.g., a WLAN), the first message containing an identity of a PLMN. The transceiver 325 receives a second message from an authentication server. Here, the second message contains a token, the token being created in response to the first message. The processor 305 enables a first device (i.e., the UE having valid access credentials) to receive the token, the first device having a first subscription with the PLMN. Note that the first device (i.e., UE) does not need to be registered with the PLMN in Option A, i.e., step 0 in FIG. 2A is optional with Option A. The registration, however, is needed in Option B, wherein NAS messages are exchanged. The transceiver 325 receives a third message from the authentication server enabling the apparatus 300 to connect to the access network using the first subscription. Here, the apparatus 300 does not perform authentication with the authentication server.

In some embodiments, the third message is sent in response to the first device authorizing the apparatus 300 to connect to the access network using the first subscription. In some embodiments, the processor 305 further creates at least one security key (e.g., MSK, PMK, etc.) from the received token in response to receiving the third message. In such embodiments, the security key is used to establish secure communication with the access network.

In some embodiments, the first message comprises a NAI of the apparatus 300, where the NAI indicates that the apparatus 300 prefers to be authorized to connect to the access network via another device that can be authenticated by the PLMN. Note that in some embodiments the N5CW device is incapable of direct authentication with the PLMN. In certain embodiments, the NAI further indicates that the apparatus does not support NAS signaling over the access network (i.e., cannot exchange NAS messages with the PLMN via the access network).

In some embodiments, the processor 305 generates a visual representation of the received token. In such embodiments, enabling the first device to receive the token comprises displaying the visual representation to the first device. In some embodiments, enabling the first device to receive the token comprises transferring the token to the first device using a device-to-device communication link.

The memory 310, in one embodiment, is a computer readable storage medium. In some embodiments, the memory 310 includes volatile computer storage media. For example, the memory 310 may include a RAM, including dynamic RAM ("DRAM"), synchronous dynamic RAM ("SDRAM"), and/or static RAM ("SRAM"). In some embodiments, the memory 310 includes non-volatile computer storage media. For example, the memory 310 may include a hard disk drive, a flash memory, or any other suitable non-volatile computer storage device. In some embodiments, the memory 310 includes both volatile and non-volatile computer storage media.

In some embodiments, the memory 310 stores data related to mobile operation and/or connecting a device to an access network. For example, the memory 310 may store various parameters, panel/beam configurations, resource assignments, policies, and the like as described above. In certain embodiments, the memory 310 also stores program code and related data, such as an operating system or other controller algorithms operating on the apparatus 300.

The input device 315, in one embodiment, may include any known computer input device including a touch panel, a button, a keyboard, a stylus, a microphone, or the like. In some embodiments, the input device 315 may be integrated with the output device 320, for example, as a touchscreen or similar touch-sensitive display. In some embodiments, the input device 315 includes a touchscreen such that text may be input using a virtual keyboard displayed on the touchscreen and/or by handwriting on the touchscreen. In some embodiments, the input device 315 includes two or more different devices, such as a keyboard and a touch panel.

The output device 320, in one embodiment, is designed to output visual, audible, and/or haptic signals. In some embodiments, the output device 320 includes an electronically controllable display or display device capable of outputting visual data to a user. For example, the output device 320 may include, but is not limited to, a Liquid Crystal Display ("LCD"), a Light-Emitting Diode ("LED") display, an Organic LED ("OLED") display, a projector, or similar display device capable of outputting images, text, or the like to a user. As another, non-limiting, example, the output device 320 may include a wearable display separate from, but communicatively coupled to, the rest of the user equipment apparatus 300, such as a smart watch, smart glasses, a heads-up display, or the like. Further, the output device 320 may be a component of a smart phone, a personal digital assistant, a television, a table computer, a notebook (laptop) computer, a personal computer, a vehicle dashboard, or the like.

In certain embodiments, the output device 320 includes one or more speakers for producing sound. For example, the output device 320 may produce an audible alert or notification (e.g., a beep or chime). In some embodiments, the output device 320 includes one or more haptic devices for producing vibrations, motion, or other haptic feedback. In some embodiments, all or portions of the output device 320 may be integrated with the input device 315. For example, the input device 315 and output device 320 may form a touchscreen or similar touch-sensitive display. In other embodiments, the output device 320 may be located near the input device 315.

The transceiver 325 communicates with one or more network functions of a mobile communication network via one or more access networks. The transceiver 325 operates under the control of the processor 305 to transmit messages, data, and other signals and also to receive messages, data, and other signals. For example, the processor 305 may selectively activate the transceiver 325 (or portions thereof) at particular times in order to send and receive messages.

The transceiver 325 includes at least transmitter 330 and at least one receiver 335. One or more transmitters 330 may be used to provide UL communication signals to a base unit 121, such as the UL transmissions described herein. Similarly, one or more receivers 335 may be used to receive DL communication signals from the base unit 121, as described herein. Although only one transmitter 330 and one receiver 335 are illustrated, the user equipment apparatus 300 may have any suitable number of transmitters 330 and receivers 335. Further, the transmitter(s) 330 and the receiver(s) 335 may be any suitable type of transmitters and receivers. In one embodiment, the transceiver 325 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 325, transmitters 330, and receivers 335 may be implemented as physically separate components that access a shared hardware resource and/or software resource, such as for example, the network interface 340.

In various embodiments, one or more transmitters 330 and/or one or more receivers 335 may be implemented and/or integrated into a single hardware component, such as a multi-transceiver chip, a system-on-a-chip, an Application-Specific Integrated Circuit ("ASIC"), or other type of hardware component. In certain embodiments, one or more transmitters 330 and/or one or more receivers 335 may be implemented and/or integrated into a multi-chip module. In some embodiments, other components such as the network interface 340 or other hardware components/circuits may be integrated with any number of transmitters 330 and/or receivers 335 into a single chip. In such embodiment, the transmitters 330 and receivers 335 may be logically configured as a transceiver 325 that uses one more common control signals or as modular transmitters 330 and receivers 335 implemented in the same hardware chip or in a multi-chip module.

Figure 4:
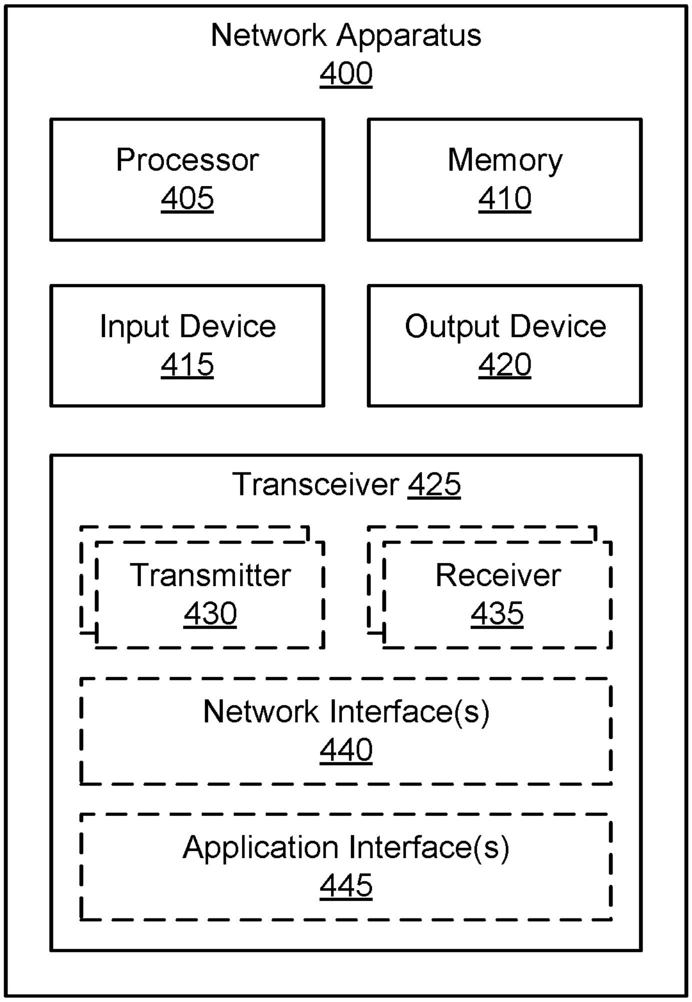
FIG. 4 is a block diagram illustrating one embodiment of a network apparatus that may be used for connecting a device to an access network.

FIG. 4 depicts a network apparatus 400 that may be used for connecting a device to an access network, according to embodiments of the disclosure. In one embodiment, network apparatus 400 may be one implementation of an evaluation device, such as the base unit 121, as described above. Furthermore, the base network apparatus 400 may include a processor 405, a memory 410, an input device 415, an output device 420, and a transceiver 425.

In some embodiments, the input device 415 and the output device 420 are combined into a single device, such as a touchscreen. In certain embodiments, the network apparatus 400 may not include any input device 415 and/or output device 420. In various embodiments, the network apparatus 400 may include one or more of: the processor 405, the memory 410, and the transceiver 425, and may not include the input device 415 and/or the output device 420.

As depicted, the transceiver 425 includes at least one transmitter 430 and at least one receiver 435. Here, the transceiver 425 may communicates with one or more remote units 105 and/or N5CW devices 110. Additionally, the transceiver 425 may support at least one network interface 440 and/or application interface 445. The application interface(s) 445 may support one or more APIs. The network interface(s) 440 may support 3GPP reference points, such as Uu, N1, N2 and N3. Other network interfaces 440 may be supported, as understood by one of ordinary skill in the art.

The processor 405, in one embodiment, may include any known controller capable of executing computer-readable instructions and/or capable of performing logical operations. For example, the processor 405 may be a microcontroller, a microprocessor, a CPU, a GPU, an auxiliary processing unit, a FPGA, or similar programmable controller. In some embodiments, the processor 405 executes instructions stored in the memory 410 to perform the methods and routines described herein. The processor 405 is communicatively coupled to the memory 410, the input device 415, the output device 420, and the transceiver 425.

In various embodiments, the network apparatus 400 is a RAN node (e.g., gNB) that communicates with one or more UEs, as described herein. In such embodiments, the processor 405 controls the network apparatus 400 to perform the above described RAN behaviors. When operating as a RAN node, the processor 405 may include an application processor (also known as "main processor") which manages application-domain and operating system ("OS") functions and a baseband processor (also known as "baseband radio processor") which manages radio functions.

In various embodiments, the processor 405 controls the apparatus 400 to perform the above described AAA functions and behaviors. In such embodiments, the transceiver 425 (i.e., supporting a network interface) receives a first message for connecting to an access network (e.g., WLAN) from a communication device (e.g., a N5CW device). Here, the first message containing a NAI of the communication device. The processor 405 determines to request a first server to authorize the communication device, said determination based on the NAI in the first message. The processor 405 controls the transceiver 425 to send a request to the first server to authorize the communication device.

The transceiver 425 further receives a response from the first server containing a token for authorizing the communication device via another device and sends a second message to the communication device, the second message containing the token. In certain embodiments, the token is specific to the communication device, but is not specific to any particular device that can be authenticated by the PLMN. For example, if a user has a N5CW device (e.g., laptop computer) and two UEs, each with their own subscription, then to access a WLAN network, the user can share the generated token with either of the UEs in order to authorize access of the N5CW device using the UE's subscription. In various embodiments, the N5CW device is incapable of direct authentication with the PLMN.

The transceiver 425 additionally receives a third message from the first server, the third message containing an identity of a first device having a first subscription (e.g., a UE having valid access credentials). Moreover, the transceiver 425 also sends a fourth message to the communication device enabling the communication device to connect to the access network using the first subscription, wherein the apparatus does not perform authentication with the communication device.

In some embodiments, the fourth message is sent in response to the first device authorizing the communication device to connect to the access network by using the first subscription. In some embodiments, the NAI indicates that the communication device prefers to be authorized via an authenticated device. In certain embodiments, the NAI indicates that the communication device does not support NAS signaling over the access network.

In some embodiments, the processor 405 further creates at least one security key (e.g., MSK, PMK, etc.) from the received token in response to receiving the third message. In such embodiments, the security key is used to establish secure communication between the communication device and the access network.

In various embodiments, the processor 405 controls the apparatus 400 to perform the above described backend server functions and behaviors. In such embodiments, the transceiver 425 (i.e., supporting a network interface) receives a first authorization message from a first device (e.g., a UE that can be authenticated by a PLMN), where the first authorization message includes a token associated with a second device (e.g., a N5CW device). The transceiver 425 sends a second authorization message to the first device. Here, the second authorization message requesting access network authorization for the second device, where the first device has a first subscription with a PLMN. The transceiver 425 further receives a third authorization message from the first device in response to a user (e.g., the subscription holder) authorizing the second device to connect to the access network using the first subscription and sends an accept message to an authentication server. Here, the accept message contains an identity of the first device and authorizes the second device to connect to the access network using the first subscription.

In some embodiments, the transceiver 425 receives a request from the authentication server to authorize the second device to connect to an access network (e.g., the WLAN) and the processor 405 generates the token in response to the request, wherein the transceiver 425 further provides the token to the authentication server.

In some embodiments, the first and third authorization messages are received from the first device using NAS messaging (i.e., received via an AMF) and the second authorization message is sent to the first device using NAS messaging (i.e., received via the AMF).

In some embodiments, the processor 405 further establishes a secure connection with the first device and authenticates the first device using credentials that identify the first subscription. In such embodiments, the first and third authorization messages are received using the secure connection and the second authorization message is sent using the secure connection. In certain embodiments, the token contains a network address of the apparatus 400.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media.

In some embodiments, the memory 410 stores data related to mobile operation and/or connecting a device to an access network. For example, the memory 410 may store parameters, configurations, resource assignments, policies, and the like, as described above. In certain embodiments, the memory 410 also stores program code and related data, such as an operating system or other controller algorithms operating on the apparatus 400.

The input device 415, in one embodiment, may include any known computer input device including a touch panel, a button, a keyboard, a stylus, a microphone, or the like. In some embodiments, the input device 415 may be integrated with the output device 420, for example, as a touchscreen or similar touch-sensitive display. In some embodiments, the input device 415 includes a touchscreen such that text may be input using a virtual keyboard displayed on the touchscreen and/or by handwriting on the touchscreen. In some embodiments, the input device 415 includes two or more different devices, such as a keyboard and a touch panel.

The output device 420, in one embodiment, is designed to output visual, audible, and/or haptic signals. In some embodiments, the output device 420 includes an electronically controllable display or display device capable of outputting visual data to a user. For example, the output device 420 may include, but is not limited to, an LCD display, an LED display, an OLED display, a projector, or similar display device capable of outputting images, text, or the like to a user. As another, non-limiting, example, the output device 420 may include a wearable display separate from, but communicatively coupled to, the rest of the network apparatus 400, such as a smart watch, smart glasses, a heads-up display, or the like. Further, the output device 420 may be a component of a smart phone, a personal digital assistant, a television, a table computer, a notebook (laptop) computer, a personal computer, a vehicle dashboard, or the like.

In certain embodiments, the output device 420 includes one or more speakers for producing sound. For example, the output device 420 may produce an audible alert or notification (e.g., a beep or chime). In some embodiments, the output device 420 includes one or more haptic devices for producing vibrations, motion, or other haptic feedback. In some embodiments, all or portions of the output device 420 may be integrated with the input device 415. For example, the input device 415 and output device 420 may form a touchscreen or similar touch-sensitive display. In other embodiments, the output device 420 may be located near the input device 415.

The transceiver 425 includes at least transmitter 430 and at least one receiver 435. One or more transmitters 430 may be used to communicate with the UE, as described herein. Similarly, one or more receivers 435 may be used to communicate with network functions in the PLMN and/or RAN, as described herein. Although only one transmitter 430 and one receiver 435 are illustrated, the network apparatus 400 may have any suitable number of transmitters 430 and receivers 435. Further, the transmitter(s) 430 and the receiver(s) 435 may be any suitable type of transmitters and receivers.

Figure 5:
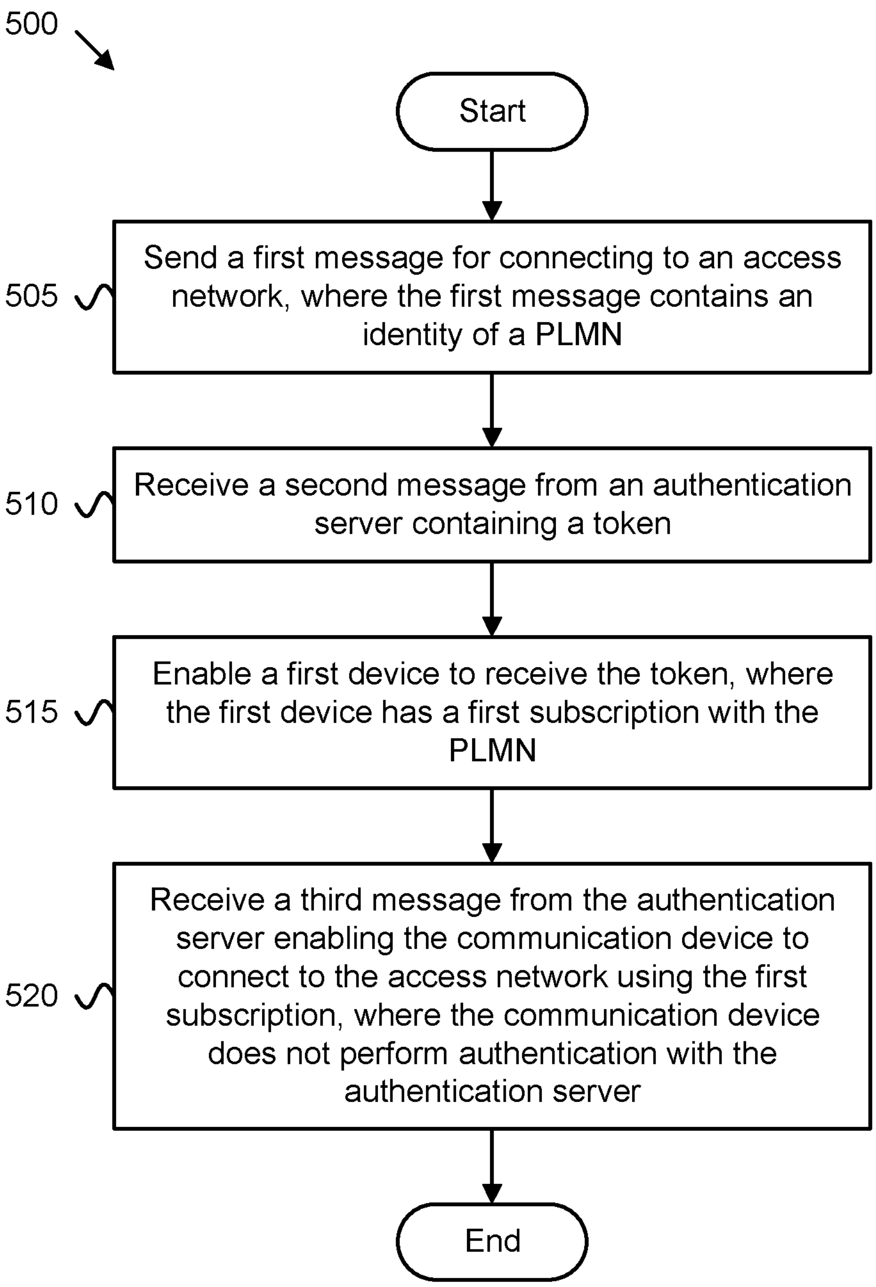
FIG. 5 is a flowchart diagram illustrating one embodiment of a first method for connecting a device to an access network.

FIG. 5 depicts one embodiment of a method 500 for connecting a device to an access network, according to embodiments of the disclosure. In various embodiments, the method 500 is performed by a communication device, such as the N5CW device 110, the N5CW device 207, and/or the user equipment apparatus 300, as described above. In some embodiments, the method 500 is performed by a processor, such as a microcontroller, a microprocessor, a CPU, a GPU, an auxiliary processing unit, a FPGA, or the like.

The method 500 begins and sends 505 a first message for connecting to an access network, where the token is created in response to the first message. The method 500 includes receiving 510 a second message from an authentication server, the second message containing a token. The method 500 includes enabling 515 a first device to receive the token, where the first device has a first subscription with the PLMN. The method includes receiving 520 a third message from the authentication server enabling the communication device to connect to the access network using the first subscription, where the communication device does not perform authentication with the authentication server. The method 500 ends.

Figure 6:
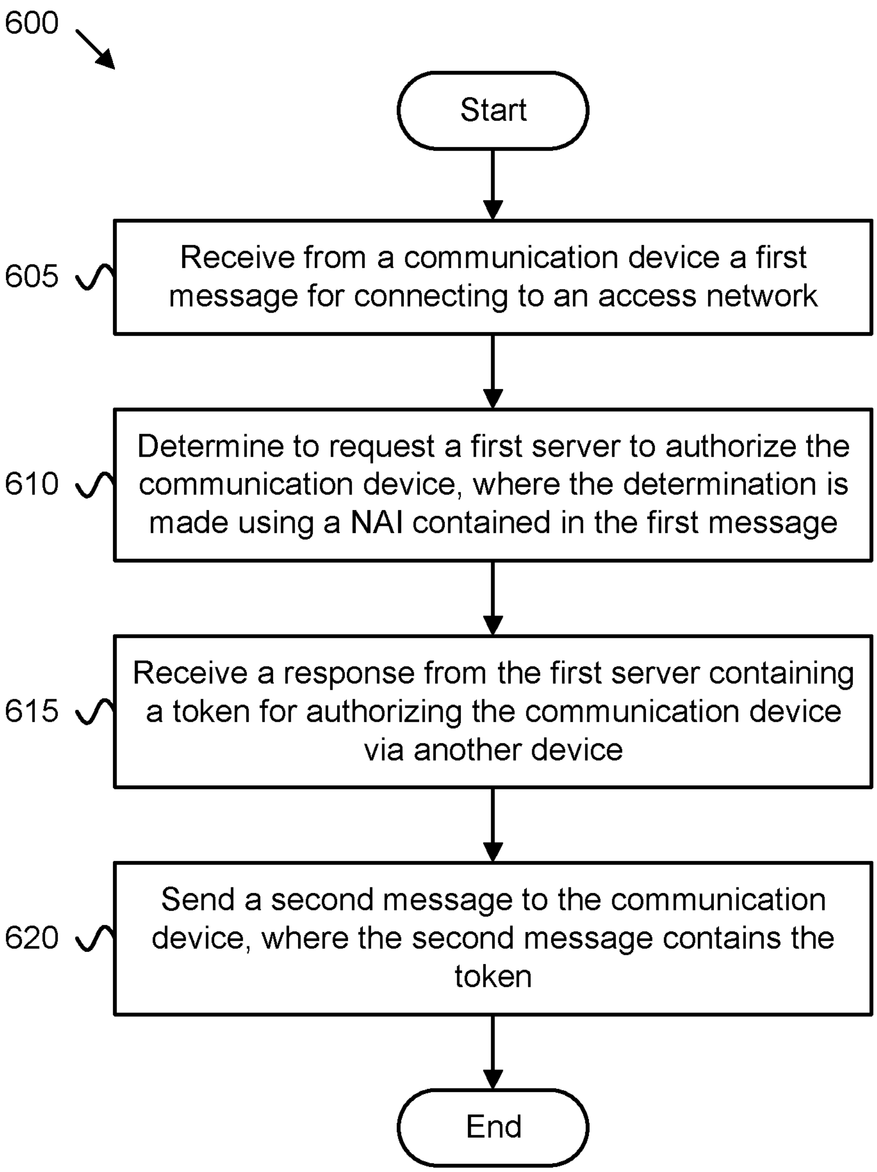
FIG. 6 is a flowchart diagram illustrating one embodiment of a second method for connecting a device to an access network.

FIG. 6 depicts one embodiment of a method 600 for connecting a device to an access network, according to embodiments of the disclosure. In various embodiments, the method 600 is performed by an authentication server, such as the AAA server 146, the AAA server 211, and/or the network apparatus 400, as described above. In some embodiments, the method 600 is performed by a processor, such as a microcontroller, a microprocessor, a CPU, a GPU, an auxiliary processing unit, a FPGA, or the like.

The method 600 begins and receives 605 from a communication device (e.g., from a N5CW device) a first message for connecting to an access network. The method 600 includes determining 610 to request a first server to authorize the communication device, where the determination is made using a NAI contained in the first message. The method 600 includes receiving 615 a response from the first server containing a token for authorizing the communication device via another device. The method 600 includes sending 620 a second message to the communication device, where the second message contains the token. The method 600 ends.

Figure 7:
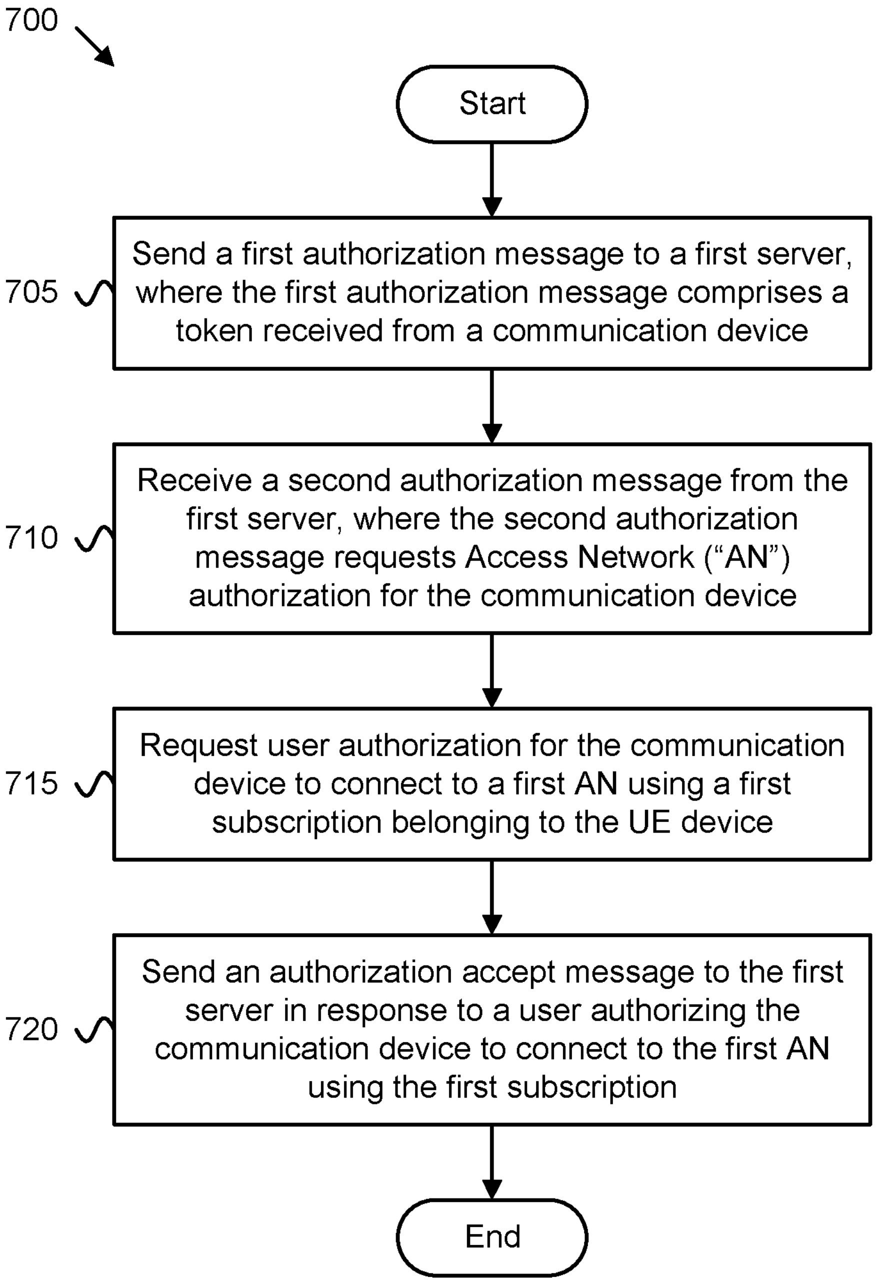
FIG. 7 is a flowchart diagram illustrating one embodiment of a third method for connecting a device to an access network.

FIG. 7 depicts one embodiment of a method 700 for connecting a device to an access network, according to embodiments of the disclosure. In various embodiments, the method 700 is performed by a user equipment device, such as the remote unit 105, the UE 205, and/or the user equipment apparatus 300, as described above. In some embodiments, the method 700 is performed by a processor, such as a microcontroller, a microprocessor, a CPU, a GPU, an auxiliary processing unit, a FPGA, or the like.

The method 700 begins and sends 705 a first authorization message to a first server, where the first authorization message comprises a token received from a communication device. The method 700 includes receiving 710 a second authorization message from the first server, where the second authorization message requests Access Network ("AN") authorization for the communication device. The method 700 includes requesting 715 user authorization for the communication device to connect to a first AN using a first subscription belonging to the UE device. The method 700 includes sending 720 an authorization accept message to the first server in response to a user authorizing the communication device to connect to the first AN using the first subscription. The method 700 ends.

Figure 8:
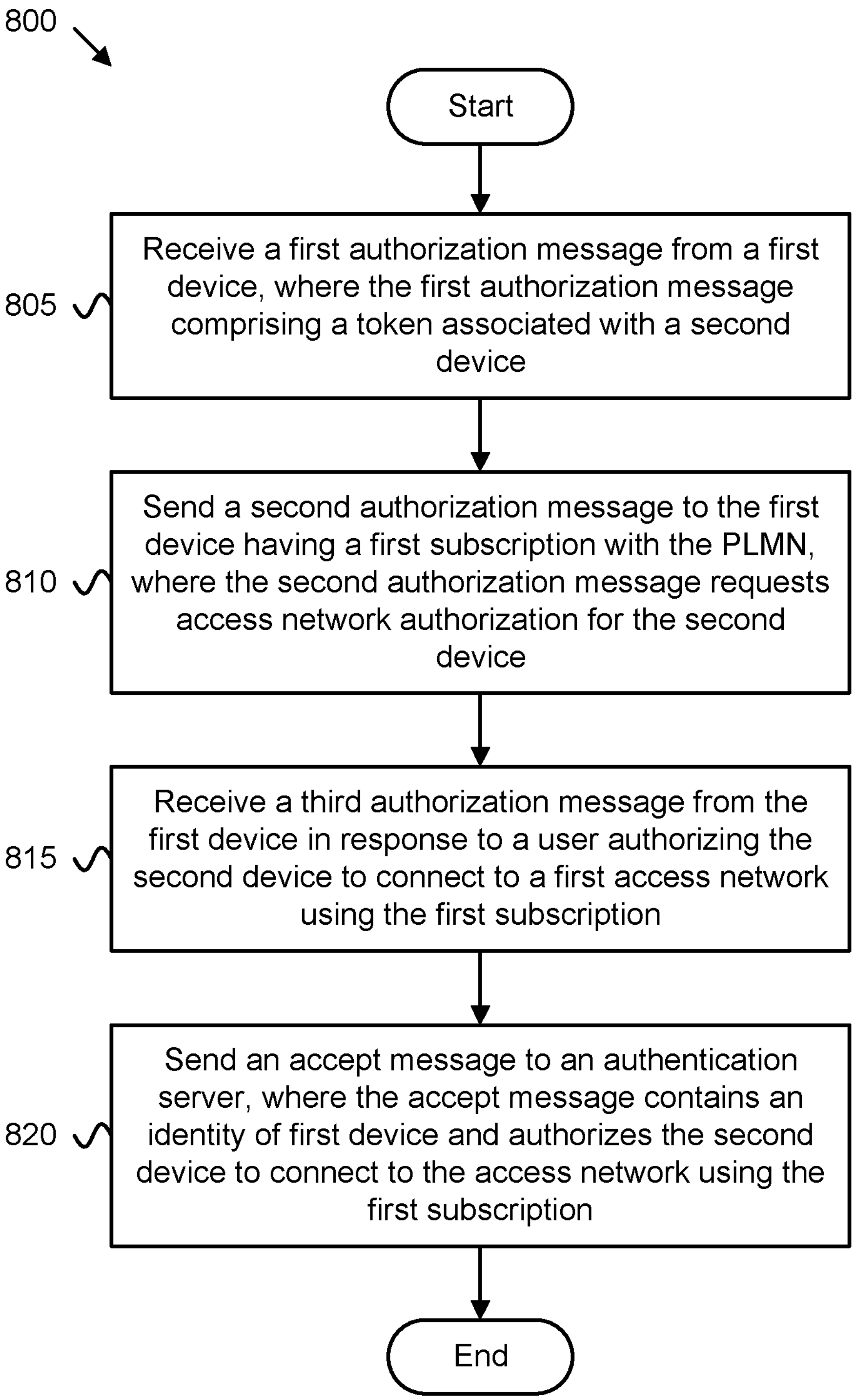
FIG. 8 is a flowchart diagram illustrating one embodiment of a fourth method for connecting a device to an access network.

FIG. 8 depicts one embodiment of a method 800 for connecting a device to an access network, according to embodiments of the disclosure. In various embodiments, the method 800 is performed by a network server, such as the Backend server 147, the Backend server 213, and/or the network apparatus 400, as described above. In some embodiments, the method 800 is performed by a processor, such as a microcontroller, a microprocessor, a CPU, a GPU, an auxiliary processing unit, a FPGA, or the like.

The method 800 begins and receives 805 a first authorization message from a first device (e.g., a UE that can be authenticated by a PLMN), where the first authorization message comprising a token associated with a second device (e.g., a N5CW device). The method 800 includes sending 810 a second authorization message to the first device having a first subscription with the PLMN, where the second authorization message requests access network authorization for the second device. The method 800 includes receiving 815 a third authorization message from the first device in response to a user authorizing the second device to connect to a first access network (e.g., a WLAN) using the first subscription. The method 800 includes sending 820 an accept message to an authentication server (e.g., an AAA server), where the accept message contains an identity of first device and authorizes the second device to connect to the access network using the first subscription. The method 800 ends.

Disclosed herein is a first apparatus for connecting a device to an access network, according to embodiments of the disclosure. The first apparatus may be implemented by a communication device, such as the N5CW device 110, the N5CW device 207, and/or the user equipment apparatus 300, described above. The first apparatus includes a processor and a transceiver (i.e., supporting a radio interface) that sends a first message for connecting to an access 20) network (e.g., a WLAN), the first message containing an identity of a PLMN. The transceiver receives a second message from an authentication server. Here, the second message contains a token, the token being created in response to the first message. The processor enables a first device (i.e., the UE having valid access credentials) to receive the token, the first device having a first subscription with the PLMN. The transceiver receives a third message from the authentication server enabling the first apparatus to connect to the access network using the first subscription. Here, the first apparatus does not perform authentication with the authentication server.

In some embodiments, the third message is sent in response to the first device authorizing the first apparatus to connect to the access network using the first subscription. In some embodiments, the processor further creates at least one security key (e.g., MSK, PMK, etc.) from the received token in response to receiving the third message. In such embodiments, the security key is used to establish secure communication with the access network.

In some embodiments, the first message comprises a Network Address Identifier ("NAI") of the first apparatus, where the NAI indicates that the first apparatus prefers to be authorized to connect to the access network via another device having a subscription with the PLMN. In certain embodiments, the NAI further indicates that the first apparatus does not support NAS signaling over the access network.

In some embodiments, the processor generates a visual representation of the received token. In such embodiments, enabling the first device to receive the token comprises displaying the visual representation to the first device. In some embodiments, enabling the first device to receive the token comprises transferring the token to the first device using a device-to-device communication link.

Disclosed herein is a first method for connecting a device to an access network, according to embodiments of the disclosure. The first method may be performed by a communication device, such as the N5CW device 110, the N5CW device 207, and/or the user equipment apparatus 300, described above. The first method includes sending a first message for connecting to an access network, where the first message contains an identity of a PLMN. The first method includes receiving a second message from an authentication server containing a token, where the token is created in response to the first message. The first method includes enabling a first device to receive the token, where the first device has a first subscription with the PLMN. The first method includes receiving a third message from the authentication server enabling the communication device to connect to the access network using the first subscription, where the communication device does not perform authentication with the authentication server.

In some embodiments, the third message is sent in response to the first device authorizing the apparatus to connect to the access network using the first subscription. In some embodiments, the first method includes creating at least one security key (e.g., MSK, PMK, etc.) from the received token in response to receiving the third message. In such embodiments, the security key is used to establish secure communication with the access network.

In some embodiments, the first message comprises a NAI of the communication device. In such embodiments, the NAI indicates that the apparatus prefers to be authorized to connect to the access network via another device having a subscription with the PLMN. In certain embodiments, the NAI further indicates that the N5CW device does not support NAS signaling over the access network.

In some embodiments, the first method includes generating a visual representation of the received token. In such embodiments, enabling the first device to receive the token comprises displaying the visual representation to the first device. In other embodiments, enabling the first device to receive the token comprises transferring the token to the first device using a device-to-device communication link.

Disclosed herein is a second apparatus for connecting a device to an access network, according to embodiments of the disclosure. The second apparatus may be implemented by an authentication server, such as the AAA server 146, the AAA server 211, and/or the network apparatus 400, described above. The second apparatus includes a processor and a transceiver (i.e., supporting a network interface) that receives a first message for connecting to an access network (e.g., WLAN) from a communication device (e.g., a N5CW device). Here, the first message containing a NAI of the communication device. The processor determines to request a first server to authorize the communication device, said determination based on the NAI in the first message.

The transceiver further receives a response from the first server containing a token for authorizing the communication device via another device and sends a second message to the communication device, the second message containing the token. The transceiver additionally receives a third message from the first server, the third message containing an identity of a first device having a first subscription (e.g., a UE having valid access credentials). Moreover, the transceiver also sends a fourth message to the communication device enabling the communication device to connect to the access network using the first subscription, wherein the apparatus does not perform authentication with the communication device.

In some embodiments, the fourth message is sent in response to the first device authorizing the communication device to connect to the access network by using the first subscription. In some embodiments, the NAI indicates that the communication device prefers to be authorized via an authenticated device. In certain embodiments, the NAI indicates that the apparatus does not support NAS signaling over the access network.

In some embodiments, the processor further creates at least one security key (e.g., MSK, PMK, etc.) from the received token in response to receiving the third message. In such embodiments, the security key is used to establish secure communication between the communication device and the access network.

Disclosed herein is a second method for connecting a device to an access network, according to embodiments of the disclosure. The second method may be performed by an authentication server, such as the AAA server 146, the AAA server 211, and/or the network apparatus 400, described above. The second method includes receiving from a communication device (e.g., from a N5CW device) a first message for connecting to an access network and determining to request a first server to authorize the communication device, where the determination is made using a NAI contained in the first message. The second method includes receiving a response from the first server containing a token for authorizing the communication device via another device and sending a second message to the communication device, where the second message contains the token.

The second method includes receiving a third message from the first server, the third message containing an identity of a first device having a first subscription (e.g., a UE that has a subscription with the PLMN). The second method includes sending a fourth message to the communication device enabling the communication device to connect to the access network using the first subscription, where the authentication server does not perform authentication with the communication device.

In some embodiments, the fourth message is sent in response to the first device authorizing the communication device to connect to the access network by using the first subscription. In some embodiments, the NAI indicates that the communication device prefers to be authorized via an authenticated device. In certain embodiments, the NAI indicates that the apparatus does not support NAS signaling over the access network.

In some embodiments, the processor further creates at least one security key (e.g., MSK, PMK, etc.) from the received token in response to receiving the third message. In such embodiments, the security key is used to establish secure communication between the communication device and the access network.

Disclosed herein is a third apparatus for connecting a device to an access network, according to embodiments of the disclosure. The third apparatus may be implemented by a user equipment device, such as the remote unit 105, the UE 205, and/or the user equipment apparatus 300, described above. The third apparatus includes a processor and a transceiver (i.e., of a radio interface) that sends a first authorization message to a first server (i.e., a backend server) and receives a second authorization message from the first server. Here, the first authorization message includes a token received from a communication device (e.g., a N5CW device) and the second authorization message requests Access Network ("AN") authorization for the communication device. The processor requests user authorization for the communication device to connect to a first AN using a first subscription belonging to the third apparatus. The transceiver sends an authorization accept message to the first server in response to a user authorizing the communication device to connect to the first AN using the first subscription.

In some embodiments, the third apparatus also includes an image capture device, such as a camera, a QR code reader, or the like. In such embodiments, receiving the token from the communication device may include capturing a visual representation of the token generated by the communication device. The processor may then obtain the token from the captured visual representation. In other embodiments, receiving the token from the communication device includes receiving the token using a device-to-device communication link.

In some embodiments, the second authorization message comprises an identity of the communication device and an identity of the first AN. In such embodiments, requesting user authorization for the communication device to connect to the first AN may include presenting to the user the identity of the communication device and the identity of the first AN. In some embodiments, the first authorization message and the authorization accept message are sent to the first server using NAS messaging (i.e., received via an AMF) and the second authorization message is received from the first server using NAS messaging (i.e., received via the AMF).

In some embodiments, the processor establishes a secure connection with the first server and authenticates the third apparatus with the first server using credentials that identify the first subscription. In such embodiments, the first authorization message and the authorization accept message are sent using the secure connection and the second authorization message is received using the secure connection. In certain embodiments, the token received from the communication device comprises a network address of the first server.

Disclosed herein is a third method for connecting a device to an access network, according to embodiments of the disclosure. The third method may be performed by a user equipment device, such as the remote unit 105, the UE 205, and/or the user equipment apparatus 300, described above. The third method includes sending a first authorization message to a first server, where the first authorization message comprises a token received from a communication 20) device. The third method includes receiving a second authorization message from the first server, where the second authorization message requests Access Network ("AN") authorization for the communication device. The third method also includes requesting user authorization for the communication device to connect to a first AN using a first subscription belonging to the UE device and sending an authorization accept message to the first server in response to a user 25 authorizing the communication device to connect to the first AN using the first subscription.

In some embodiments, the UE device includes an image capture device, such as a camera, a QR code reader, or the like. In such embodiments, receiving the token from the communication device may include capturing a visual representation of the token generated by the communication device. In other embodiments, receiving the token from the communication device comprises receiving the token using a device-to-device communication link.

In some embodiments, the second authorization message comprises an identity of the communication device and an identity of the first AN. In such embodiments, requesting user authorization for the communication device to connect to the first AN comprises presenting to the user the identity of the communication device and the identity of the first AN. In some embodiments, the first authorization message and the authorization accept message are sent to the first server using NAS messaging (i.e., received via an AMF) and the second authorization message is received from the first server using NAS messaging (i.e., received via the AMF).

In some embodiments, the third method includes establishing a secure connection with the first server; and authenticating the UE device with the first server using credentials that identify the first subscription. In such embodiments, the first authorization message and the authorization accept message are sent using the secure connection and the second authorization message is received using the secure connection. In certain embodiments, the token received from the communication device comprises a network address of the first server.

Disclosed herein is a fourth apparatus for connecting a device to an access network, according to embodiments of the disclosure. The fourth apparatus may be implemented by a network server in a mobile communication network, such as the Backend server 147, the Backend server 213, and/or the network apparatus 400, described above. The fourth apparatus includes a processor and a transceiver that receives a first authorization message from a first device (e.g., a UE that can be authenticated by a PLMN), where the first authorization message includes a token associated with a second device (e.g., a N5CW device). The transceiver sends a second authorization message to the first device. Here, the second authorization message requesting access network authorization for the second device, where the first device has a first subscription with a PLMN. The transceiver further receives a third authorization message from the first device in response to a user (e.g., the subscription holder) authorizing the second device to connect to the access network using the first subscription and sends an accept message to an authentication server. Here, the accept message contains an identity of the first device and authorizes the second device to connect to the access network using the first subscription.

In some embodiments, the transceiver receives a request from the authentication server to authorize the second device to connect to an access network (e.g., the WLAN) and the processor generates the token in response to the request, wherein the transceiver further provides the token to the authentication server.

In some embodiments, the first and third authorization messages are received from the first device using NAS messaging (i.e., received via an AMF) and the second authorization message is sent to the first device using NAS messaging (i.e., received via the AMF).

In some embodiments, the processor further establishes a secure connection with the first device and authenticates the first device using credentials that identify the first subscription. In such embodiments, the first and third authorization messages are received using the secure connection and the second authorization message is sent using the secure connection. In certain embodiments, the token contains a network address of the fourth apparatus.

Disclosed herein is a fourth method for connecting a device to an access network, according to embodiments of the disclosure. The fourth method may be performed by a network server in a mobile communication network, such as the Backend server 147, the Backend server 213, and/or the network apparatus 400, described above. The fourth method includes receiving a first authorization message from a first device (e.g., a UE that can be authenticated by a PLMN), where the first authorization message comprising a token associated with a second device (e.g., a N5CW device). The fourth method includes sending a second authorization message to the first device. Here, the second authorization message requests access network authorization for the second device, where the first device has a first subscription with the PLMN. The fourth method includes receiving a third authorization message from the first device in response to a user authorizing the second device to connect to a first access network (e.g., a WLAN) using the first subscription and sending an accept message to an authentication server (e.g., an AAA server). Here, the accept message contains an identity of first device and authorizes the second device to connect to the access network using the first subscription.

In some embodiments, the fourth method includes receiving a request from the authentication server to authorize the second device to connect to an access network (e.g., the WLAN) and the processor generates the token in response to the request. In such embodiments, the fourth method further includes providing the token to the second device via the authentication server, where the second device provides the token to the first device.

In some embodiments, the first and third authorization messages are received from the first device using NAS messaging (i.e., received via an AMF) and the second authorization message is sent to the first device using NAS messaging (i.e., received via the AMF).

In some embodiments, the fourth method includes establishing a secure connection with the first device and authenticating the first device using credentials that identify the first subscription. In such embodiments, the first and third authorization messages are received using the secure connection and the second authorization message is sent using the secure connection. In certain embodiments, the token includes a network address of the server.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:

a memory; and a processor coupled with the memory and configured to cause the apparatus to:

transmit a first message for connecting to a wireless local area network ("WLAN") access network using an Extensible Authentication Protocol ("EAP") procedure, wherein the first message includes an identity of a Public Land Mobile Network ("PLMN"), wherein the WLAN access network is associated with the PLMN, and wherein the first message further includes an indication to authorize the apparatus to connect to the WLAN access network via another device having a subscription with the PLMN;

receive a second message from an authentication server, the second message comprising a token;

share the token with a user equipment ("UE"), wherein the UE has a first subscription with the PLMN; and receive a third message from the authentication server enabling the apparatus to connect to the WLAN access network using the first subscription, wherein the apparatus refrains from performing authentication with the authentication server.

2. The apparatus of claim 1, wherein the third message is received-in response to the UE authorizing the apparatus to connect to the WLAN access network using the first subscription.

3. The apparatus of claim 1, wherein the first message comprises a Network Address Identifier ("NAI") of the apparatus, wherein the NAI comprises the indication to authorize the apparatus connect to the WLAN access network via the another device.

4. The apparatus of claim 3, wherein the apparatus is unable to perform authentication with the PLMN using Non-Access Stratum ("NAS") signaling over the WLAN access network, and wherein the NAI further indicates that the apparatus does not support NAS signaling over the WLAN access network.

5. The apparatus of claim 1, wherein the processor is configured to cause the apparatus to generate a visual representation of the received token, and wherein to share the token with the UE, the processor is configured to cause the apparatus to display the visual representation to the UE.

6. The apparatus of claim 1, wherein to share the token with the UE, the processor is configured to cause the apparatus to transfer the token to the UE using a device-to-device communication link.

7. The apparatus of claim 1, wherein the processor is configured to cause the apparatus to create at least one security key from the received token in response to receiving the third message, wherein the security key is used to establish secure communication with the WLAN access network.

8. The apparatus of claim 1, wherein the token is encapsulated in an EAP request packet, and wherein the processor is configured to cause the apparatus to transmit, to the authentication server, an EAP response packet confirming receipt of the token.

9. An authentication server apparatus in a Public Land Mobile Network ("PLMN"), the authentication server apparatus comprising:

a memory; and a processor coupled with the memory and configured to cause the authentication server apparatus to:

receive, from a communication device during an Extensible Authentication Protocol ("EAP") procedure, a first message for connecting to a wireless local area network ("WLAN") access network associated with a Public Land Mobile Network ("PLMN"), the first message comprising a Network Address Identifier ("NAI") of the communication device, an identity of the WLAN access network and an identity of the PLMN, and wherein the first message further includes an indication to authorize the communication device to connect to the WLAN access network via another device having a subscription with the PLMN;

determine, based on the NAI in the first message, to request a first server to authorize the communication device;

receive, from the first server, a response comprising a token for authorizing the communication device via the another device;

transmit a second message to the communication device, the second message comprising the token;

receive, from the first server, a third message comprising containing an identity of a user equipment ("UE") having a first subscription with the PLMN; and transmit, to the communication device, a fourth message enabling the communication device to connect to the WLAN access network using the first subscription, wherein the authentication server apparatus refrains from performing authentication with the communication device.

10. The authentication server apparatus of claim 9, wherein the fourth message is transmitted in response to the UE authorizing the communication device to connect to the WLAN access network by using the first subscription.

11. The authentication server apparatus of claim 10, wherein the processor is configured to cause the authentication server apparatus to create at least one security key from the received token in response to receiving the third message, wherein the security key is used to establish secure communication between the communication device and the WLAN access network.

12. The authentication server apparatus of claim 11, wherein the fourth message is transmitted to the communication device via the WLAN access network, and wherein the fourth message is included in an authentication message that further includes the security key and one or more connectivity restrictions for the communication device.

13. The authentication server apparatus of claim 9, wherein the processor is configured to cause the authentication server apparatus to retrieve subscription information based on the identity of the UE; generate connectivity restrictions for the communication device based on the retrieved subscription information; and transmit the connectivity restrictions to the WLAN access network.

14. The authentication server apparatus of claim 9, wherein the processor is configured to cause the authentication server apparatus to:

encapsulate the token in an EAP request packet; and receive, from the communication device, an EAP response packet confirming receipt of the token.

15. A network apparatus comprising:

a memory; and a processor coupled with the memory and configured to cause the network apparatus to:

receive a first request message from an authentication server in a Public Land Mobile Network ("PLMN"), the first request message comprising a first identity of a communication device and a second identity of a wireless local area network ("WLAN") access network associated with the PLMN, wherein the first request message indicates a request to authorize the communication device to connect to the WLAN access network via another device having a subscription with the PLMN;

transmit a response to the first message to the authentication server, the response comprising a token associated with the communication device;

receive a first authorization message from a user equipment ("UE"), the first authorization message comprising the token;

transmit, to the UE, a second authorization message requesting access network authorization for the communication device, wherein the UE has a first subscription with the PLMN;

receive a third authorization message from the UE in response to a user authorizing the communication device to connect to the WLAN access network using the first subscription; and transmit, to the authentication server, an accept message comprising an identity of the UE and authorizing the communication device to connect to the WLAN access network using the first subscription.

16. The network apparatus of claim 15, wherein the first request message is associated with a session with the authentication server, wherein the processor is configured to cause the network apparatus to generate the token in response to the first request message, and wherein the token is a unique token associated with the session.

17. The network apparatus of claim 15, wherein the first authorization message and the third authorization message are received from the UE using Non-Access Stratum ("NAS") messaging, and wherein the second authorization message is transmitted to the UE using NAS messaging.

18. The network apparatus of claim 15, wherein the processor is configured to cause the network apparatus to:

establish a secure connection with the UE; and authenticate the UE using credentials that identify the first subscription, wherein the first and third authorization messages are received using the secure connection and the second authorization message is sent using the secure connection.

19. The network apparatus of claim 18, wherein the token comprises a network address of the network apparatus.

20. The network apparatus of claim 15, wherein the second authorization message comprises the first identity of a communication device and the second identity of the WLAN access network.

* * * * *